(12) United States Patent
Aljaedi

(10) Patent No.: US 10,200,279 B1
(45) Date of Patent: Feb. 5, 2019

(54) TRACER OF TRAFFIC TRAJECTORIES IN DATA CENTER NETWORKS

(71) Applicant: Amer Omar Aljaedi, Tabuk (SA)

(72) Inventor: Amer Omar Aljaedi, Tabuk (SA)

( * ) Notice: Subject to any disclaimer, the term of this patent is extended or adjusted under 35 U.S.C. 154(b) by 0 days.

(21) Appl. No.: 15/723,821

(22) Filed: Oct. 3, 2017

(51) Int. Cl.
| | |
|---|---|
| *H04L 12/721* | (2013.01) |
| *H04L 12/751* | (2013.01) |
| *H04L 12/947* | (2013.01) |
| *H04L 12/26* | (2006.01) |
| *H04L 12/24* | (2006.01) |
| *H04L 12/753* | (2013.01) |

(52) U.S. Cl.
CPC .............. *H04L 45/26* (2013.01); *H04L 41/20* (2013.01); *H04L 43/12* (2013.01); *H04L 45/02* (2013.01); *H04L 45/48* (2013.01); *H04L 49/25* (2013.01)

(58) Field of Classification Search
CPC ....... H04L 43/045; H04L 43/06; H04L 43/10; H04L 45/24; H04L 45/28; H04L 45/02; H04L 45/38
See application file for complete search history.

(56) References Cited

U.S. PATENT DOCUMENTS 9,419,874 B2   8/2016   Sun et al.

| | | |
|---|---|---|
| 2015/0256397 A1 | 9/2015 | Agarwal |
| 2016/0119204 A1* | 4/2016 | Murasato ............. G06F 3/0481 715/735 |
| 2018/0227209 A1* | 8/2018 | Lin ........................ H04L 43/10 |

FOREIGN PATENT DOCUMENTS

WO        2015/119611        8/2015

OTHER PUBLICATIONS

Nikhil Handigol et al., "Where Is the Debugger for My Software-Defined Network?", pp. 55-60, Aug. 13, 2012, http://dl.acm.org/citation.cfm?id=2342453.

* cited by examiner

*Primary Examiner* — Mewale A Ambaye
(74) *Attorney, Agent, or Firm* — Oblon, McClelland, Maier & Neustadt, L.L.P.

(57) ABSTRACT

A SDN controller is configured to generate and install a tracing table with tracing rules into switches of a SDN based on a switch level in a network topology of the SDN; identify a source switch and a destination switch for tracing a trajectory path of a transit packet; generate a probe packet; set all bytes in a source address to zero and initialize a DSCP field to 16; inject the probe packet into the source switch; encode selective ingress ports of intermediate switches within the trajectory path into the source address of the probe packet; receive the probe packet when the probe packet reaches the destination switch; and reconstruct the trajectory path of the transit packet, via encoded information in the source address of the probe packet, wherein the reconstructed trajectory path is constructed via the encoded selective ingress ports of the one or more intermediate switches.

18 Claims, 22 Drawing Sheets

$$M = \begin{bmatrix} b_{1,1} & 0 & \cdots & \cdot & 0 \\ 0 & b_{2,2} & \cdot & \cdot & \cdot \\ \cdot & \cdot & \cdot & \cdot & \cdot \\ \cdot & \cdot & \cdot & \cdot & \cdot \\ 0 & \cdot & \cdots & \cdot & b_{n,n} \end{bmatrix}$$

Fig. 3B

```
priority = 6, DL_SRC = 00:00:00:00:00:00/ff:00:00:00:00:00
Actions = copy:OXM_OF_IN_PORT[0..7]→OXM_OF_ETH_SRC[40..47],
goto_table(forwarding)
 . . .
 . . .
 . . .
priority = 1, DL_SRC = 00:00:00:00:00:00/00:00:00:00:00:ff
Actions = copy:OXM_OF_IN_PORT[0..7]→OXM_OF_ETH_SRC[0..7],
goto_table(forwarding)
```

Fig. 4

Algorithm 1: Backtracking the packet trajectory

Input: PkIn: PACKET_IN, $M_{SRC}$: source MAC address
   $PO_{FIRST}$: position of the first intermediate switch in its Pod
Output: $\mathbb{L}$: (S) ordered list of switches, where $S \in$ probe's path
1: Initialize: $\mathbb{L} \leftarrow \emptyset$, Agg $\leftarrow 0$
2: CB := *CountBytes* ($M_{SRC}$), where byte $\neq 0$
3: Port := *GetIngressPort* (PkIn)
4: SW := *GetNeighborSwitch* (ToR$_{DST}$, Port)
5: *Push* (SW) $\rightarrow \mathbb{L}$
6: LSB := CB, CurrSwitch := SW
7: while (LSB − 2) > 0 do
8:    Port := *GetValue* (LSB, $M_{SRC}$)
9:    if Port > *(K/2)* and *isToR*(CurrSwitch)
10:    and Port is preceded by (Z >128) then
11:      CurrSwitch := *GetSwitch* (Pod$_{DST}$, PO$_{FIRST}$)
12:      *Push* (CurrSwitch) $\rightarrow \mathbb{L}$
13:    end if
14:    Switch := *GetNeighborSwitch* (CurrSwitch, Port)
15:    *Push* (Switch) $\rightarrow \mathbb{L}$
16:    CurrSwitch $\leftarrow$ Switch
17:    LSB $\leftarrow$ LSB −1
18: end while
19: if CB > 3 then
20:    if first and second bytes in $M_{SRC} \leq$ *(K/2)* then
21:      Agg := *GetSwitch* (Pod$_{SRC}$, *Position* (last inserted Agg in $\mathbb{L}$))
22:    else
23:      Pod := *GetPod* (last inserted $S$ in $\mathbb{L}$)
24:      Agg := *GetSwitch* (Pod, PO$_{FIRST}$)
25:    end if
26: else
27:    if last encoded port $\leq$ *(K/2)* and preceded by port > *(K/2)* then
28:      Agg := *GetSwitch* (Pod$_{DST}$, PO$_{FIRST}$)
29:    else Agg := *GetSwitch* (Pod$_{SRC}$, *Position* (SW))
30:    end if
31: end if
32: Switch:= *GetNeighborSwitch* (Agg, *GetValue* (2, $M_{SRC}$))
33: if last inserted $S \neq$ Agg then
34:    *Push* (Agg) $\rightarrow \mathbb{L}$
35: end if
36: *Push* (Switch) $\rightarrow \mathbb{L}$
37: Return: $\mathbb{L}$

Fig. 8

Path 1 = T1 → A2 → C4 → A8 → T8 → A7 → C1 → A3 → T3

Path 2 = T1 → A1 → C2 → A5 → T6 → A6 → C3 → A4 → T4 → A3 → T3

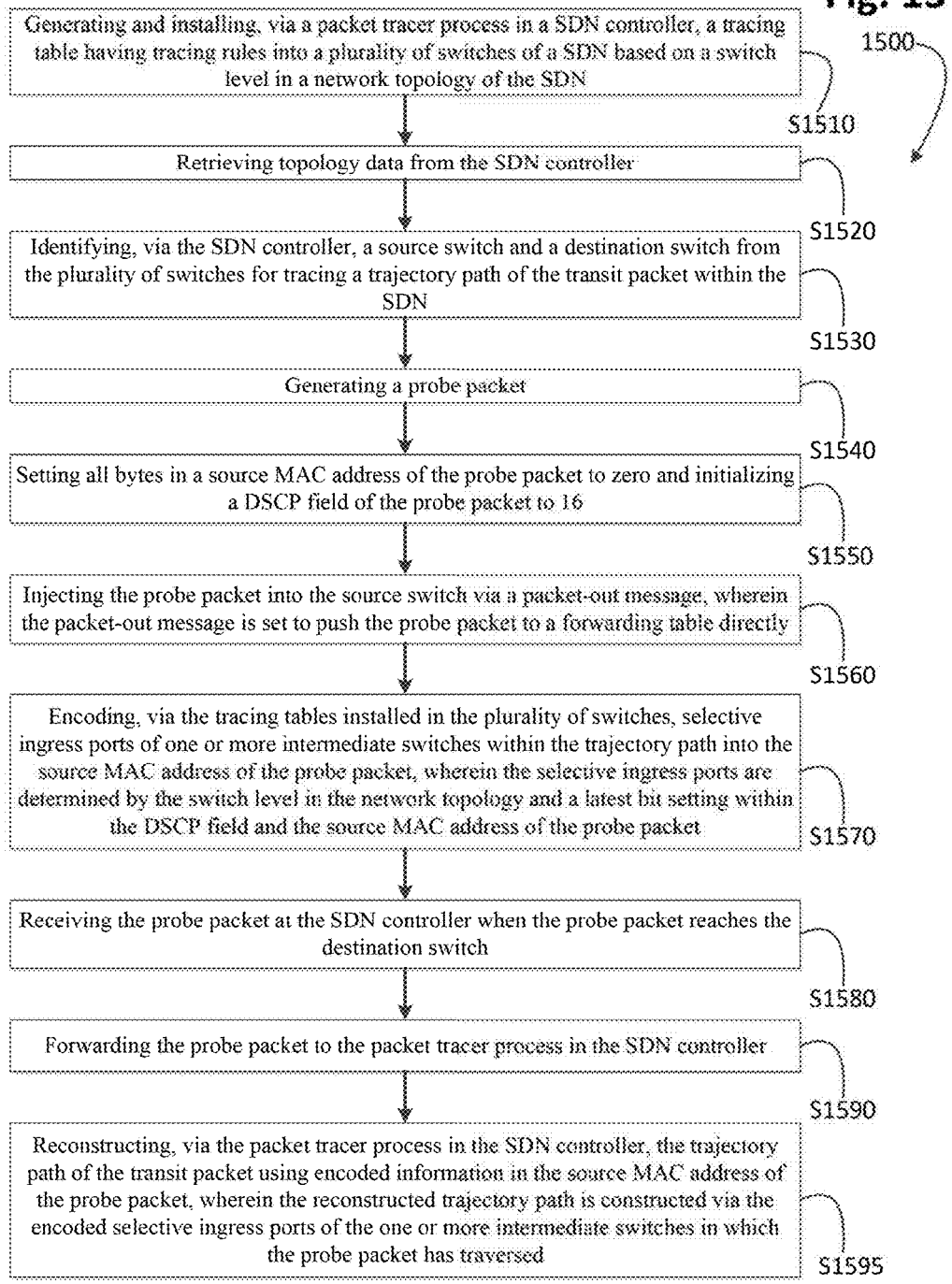

TRACER OF TRAFFIC TRAJECTORIES IN DATA CENTER NETWORKS

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention in the United States.

TECHNICAL FIELD

The present invention relates generally to an improved network packet processing method and apparatus and more specifically to methods of packet tracing for Software-Defined networking in data center environment.

BACKGROUND

Software-Defined Networking (SDN) makes network management easier and more flexible, especially in a datacenter environment. It facilitates implementing customized network functionality by separating the control plane (which decides how to handle traffic in network) from the data plane (which forwards traffic as instructed by the control plane) in order to centralize network's intelligence and state. Thus, it abstracts the complexity of the underlying physical network, and allows network engineers to focus on optimizing network operations. Under the SDN paradigm, network operators can specify high-level network policies, which are automatically translated into low-level rules/instructions and installed in network switches by a logically centralized controller. The controller can use OpenFlow, which is a standard interface for the communication between the SDN controller and the SDN switches. OpenFlow defines primitive instructions for programming the SDN switch and controls their forwarding behavior by an external application running in the SDN controller.

Due to the scale and dynamic nature of datacenter networks, a network controller should adapt to the rapid change in network configurations as users/applications come and go, or when the network topology changes. The enhanced control offered by SDN aligns well with the nature and requirements of modern datacenter networks.

While this flexibility enables SDN programmers to develop innovative load balancing techniques, a scalable routing scheme, and traffic isolation methods in datacenter networks, it inherits similar challenges of debugging complex software. In addition to encountering misconfiguration errors and failures, SDN developers need to validate the correctness of their routing algorithm, identify the weaknesses in their load balancing technique, and/or evaluate the efficiency of the traffic monitoring application. Therefore, the SDN debugging method and troubleshooting tool are essential for understanding the network forwarding behavior and tracing the flow of traffic along the network paths. Such a debugging tool should help to localize network problems and verify whether the path taken by a packet/flow conforms to the network policies in the controller.

Traditional network tools such as NetFlow, sFlow, SNMP, and traceroute can be insufficient for debugging tasks in the SDN environment. As a result, a number of SDN tools have been developed to accomplish such tasks smoothly. Some of these tools require maintaining updated snapshots of the network-wide forwarding states. Therefore, they consistently collect the network configurations, either by dumping flow rules installed at switches or by capturing the control traffic between the controller and switches. However, in addition to the overhead of collecting such information about the network state, analyzing the network configurations alone cannot assist in detecting errors that are related to the data plane, such as bugs in switch firmware or limited memory space to enforce the configuration.

An alternative debugging approach for SDN is to trace the path(s) that was taken by a realistic flow from the source node to the destination node, which is often described as "the ground-truth forwarding behavior" in SDN literature, rather than infer it from the configurations of the switches. NetSight follows this approach to gather packet histories, but it modifies the existing flow rules in the network to emit postcards from every switch that the traced packet traverses. A postcard contains information about the traced packet, switch, matching flow entry, and output port. The network controller uses these postcards to reconstruct the path of the packet. However, it incurs significant logging overhead of the trajectories of the packets.

In contrast, lightweight tools, such as PathQuery and PathletTracer provide methods to trace the packet trajectory in a network while minimizing the overhead of data collection. However, both tools trade off the data plane resources in order to collect only the necessary data for pre-determined queries. For example, PathletTracer utilizes "Precise Calling Context Encoding" (PCCE) to minimize the encoded bits in the packet header during the path tracing process, but ultimately requires a large number of flow rules, especially for datacenter networks, where there are many paths between each pair of edge nodes. A similar drawback occurs with PathQuery in terms of data plane resources.

CherryPick proposes a simplified technique for tracing packet trajectories in a fat-tree topology. It attempts to minimize the number of flow rules required for the tracing process. CherryPick exploits the fact that datacenter network topologies are often well-structured, so it assigns each network-link a unique identifier. These link identifiers are inserted selectively into the packet header along its path using a VLAN tag. Although CherryPick picks a minimum number of essential links to represent an end-to-end path, it incurs high header space overhead. For example, it inserts three VLAN tags (i.e., an added 96 bits) into the packet header that traverses eight hops (e.g., due to failure along the shortest path) in a fat-tree topology. Moreover, it relies on the correctness of the network sub-netting scheme in the datacenter.

The "background" description provided herein is for the purpose of generally presenting the context of the disclosure. Work of the presently named inventors, to the extent it is described in this background section, as well as aspects of the description which may not otherwise qualify as conventional at the time of filing, are neither expressly nor impliedly admitted as conventional against the present disclosure.

SUMMARY

In one embodiment, a method of efficiently tracing a transit packet through a network, includes generating and installing, via a packet tracer process in a Software Defined Network (SDN) controller, a tracing table having tracing rules into a plurality of switches of a SDN based on a switch level in a network topology of the SDN; retrieving topology data from the SDN controller; identifying, via the SDN controller, a source switch and a destination switch from the plurality of switches for tracing a trajectory path of the transit packet within the SDN; generating a probe packet; setting all bytes in a source Media Access Control (MAC) address of the probe packet to zero and initializing a Differentiated Services Code Point (DSCP) field of the probe packet to 16; injecting the probe packet into the source switch via a packet-out message, wherein the packet-out message is set to push the probe packet to a forwarding table directly; encoding, via the tracing tables installed in the plurality of switches, selective ingress ports of one or more intermediate switches within the trajectory path into the source MAC address of the probe packet, wherein the selective ingress ports are determined by the switch level in the network topology and a latest bit setting within the DSCP field and the source MAC address of the probe packet; receiving the probe packet at the SDN controller when the probe packet reaches the destination switch; forwarding the probe packet to the packet tracer process in the SDN controller; and reconstructing, via the packet tracer process in the SDN controller, the trajectory path of the transit packet using encoded information in the source MAC address of the probe packet, wherein the reconstructed trajectory path is constructed via the encoded selective ingress ports of the one or more intermediate switches in which the probe packet has traversed.

In a similar embodiment, a method is implemented by a computer with instructions for tracing a path taken by a transmit packet in a datacenter network, wherein a forwarding table in network devices forwards the transit packet to a next hop based on addresses in a layer 3, a layer 4, or both layers of the transit packet. Therefore, the provided tracing method can use the layer 2 fields of the transit packet to efficiently encode information of the trajectory path of the transit packet in lieu of relying on tags, such as VLAN or MPLS, which increase the overhead of the packet header space.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3B illustrates a bitmask of flow entries represented by a diagonal matrix M according to one embodiment;

FIG. 4 illustrates exemplary first and last OpenFlow tracing rules for Top-of-Rack and Aggregate switches according to one embodiment;

FIG. 8 illustrates Algorithm 1 according to one embodiment;

FIG. 15 is an exemplary flowchart for a method of efficiently tracing a transit packet through a network according to one embodiment.

DETAILED DESCRIPTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

It will be appreciated that in the development of any such actual implementation, numerous implementation-specific decisions need to be made in order to achieve the developer's specific goals, such as compliance with application- and business-related constraints, and that these specific goals will vary from one implementation to another and from one developer to another.

Embodiments herein describe tracing packet trajectories in an SDN environment with datacenter network topology, such as a fat-tree topology. Certain fields in a packet header are reused for encoding the path of a traced packet.

A fat-tree topology is a multi-tier Clos network (named after founder Charles Clos), which represents a theoretical idealization of practical multi-stage switching systems. Clos networks can be used when physical circuit switching needs exceed a capacity of the largest feasible single crossbar switch.

A fat-tree topology includes $(2w-1)\times(k/2)^{w-1}$ switches, where w is the number of switch levels in a fat-tree topology and k is the switch port density. The fat-tree can connect $k \times (k/2)^{w-1}$ servers in the network. For embodiments described herein, a three-level fat-tree, which is also named k-ary fat-tree in the datacenter network literature is used. Levels of the fat-tree topology include a Top-of-Rack (ToR) level, an Aggregate (Agg) level, and a Core level. Each level of the fat-tree topology has k-port switches.

Figure 1A:
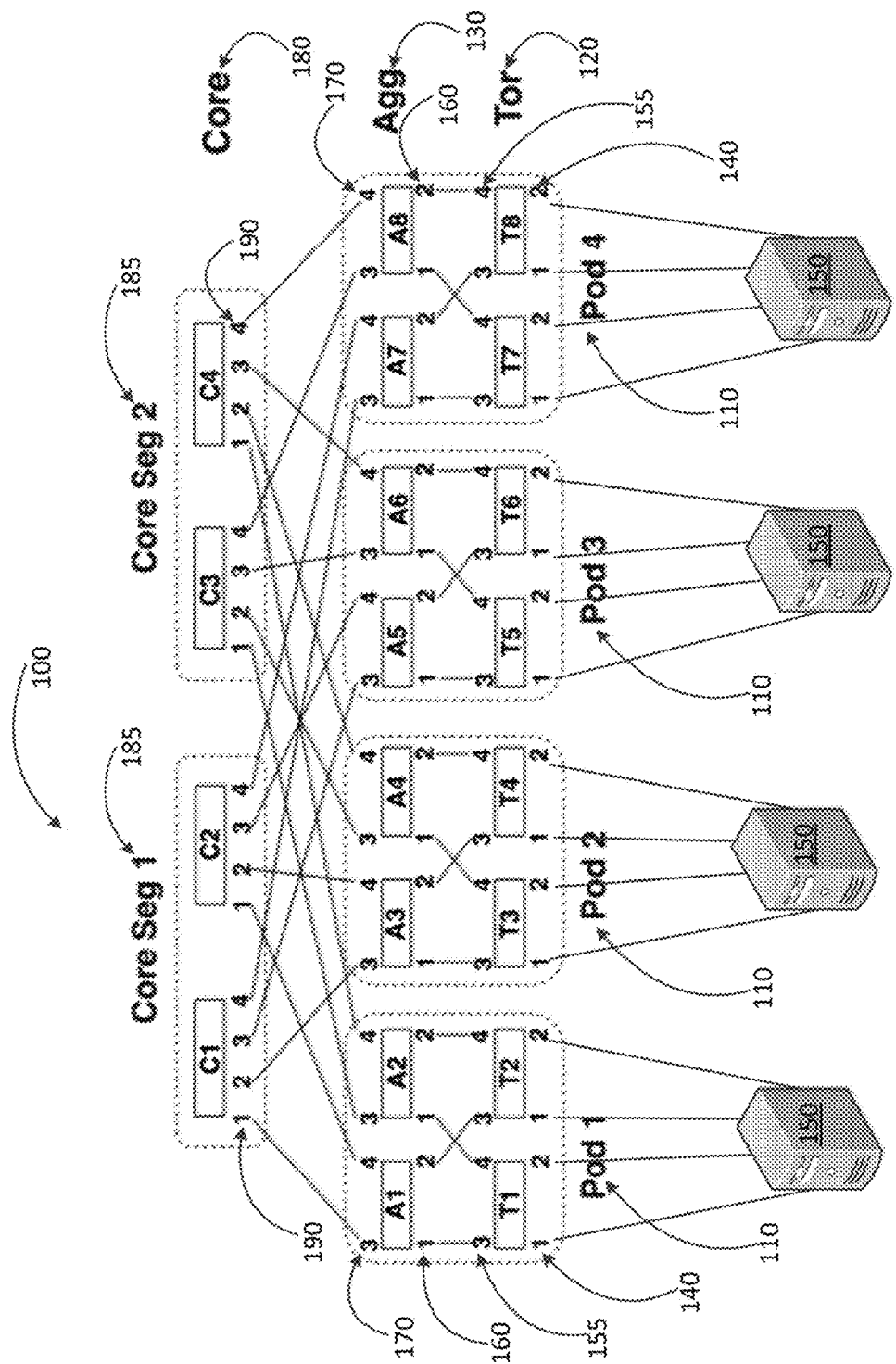
FIG. 1A illustrates an exemplary fat-tree topology according to one embodiment.

FIG. 1A illustrates an exemplary fat-tree topology 100 as used in embodiments described herein. The fat-tree topology 100 has k pods 110, wherein each pod 110 has k/2 ToR switches 120 and k/2 Agg switches 130. Lower ports 140 L e k of the ToR switches 120 are directly connected to one or more servers 150, where L denotes a port number in [1, k/2]. Each of the upper ToR ports 155 H⊂k in the ToR switches 120 is connected to L∈Agg switches 130 in the same pod 110 from left to right, where H denotes a port number in [(k+2)/2, k]. The upper Agg ports 170 (H ports) of each Agg switch 130 are connected to Core switches 180 that are located in a specific Core segment 185 based on the Agg switch 130 position in the pod 110.

There are a total of $(k/2)^2$ Core switches 180, where $port_p$ 190 of each $Core_i$ switch 180 is connected to $pod_p$ 110 through $Agg_i$ switch 130 in that pod 110. For example, in FIG. 1A, the second Agg switch 130 in each pod 110 (i.e., A2, A4, A6, A8) is connected directly to the Core switches 180 (i.e., C3, C4) in the second Core segment 185. As each ToR switch 120 is connected to all Agg switches 130 in the same pod 110 and each Agg switch 130 is connected to all Core switches 180 in the same Core segment 185 (i.e., each core segment 185 has k/2 Core switches 180), there are $(k/2)^2$ different shortest paths between any given pair of ToR switches 120 in different pods 110.

In FIG. 1A, servers 150 are connected to the lower ports 140 of a respective pod 110. However, other physical configurations are contemplated by embodiments described herein. For example, more than one server 150 can be connected to the lower ports 140 of each pod 110, or multiple pods 110 can be connected to a single server 150. In addition, multiple servers 150 can be connected together and run in parallel within the fat-tree topology 100 illustrated in FIG. 1A. In FIG. 1A, servers 150 include processing circuitry configured to execute functions within the fat-tree topology 100.

The rich connectivity and bisection bandwidth of the fat-tree topology scales linearly with the network size, which makes the topology inherently resilient with a large number of redundant paths between any pair of edge switches. Therefore, the fat-tree topology is attractive for building medium and large scale interconnecting non-blocking networks and for High Performance Computing Cloud (HPC Cloud) environments.

SDN facilitates configuring and controlling the network switches shown in FIG. 1A dynamically. In an SDN environment, the SDN controller is the responsible entity for configuring the network forwarding elements since it can directly access and manipulate the forwarding instructions in the switches via a low level interface, such as OpenFlow. Thus, the SDN controller can operate as a network system on a separate server or cluster of servers for high performance, and connect to the network switches via a designated control network.

Figure 1B:
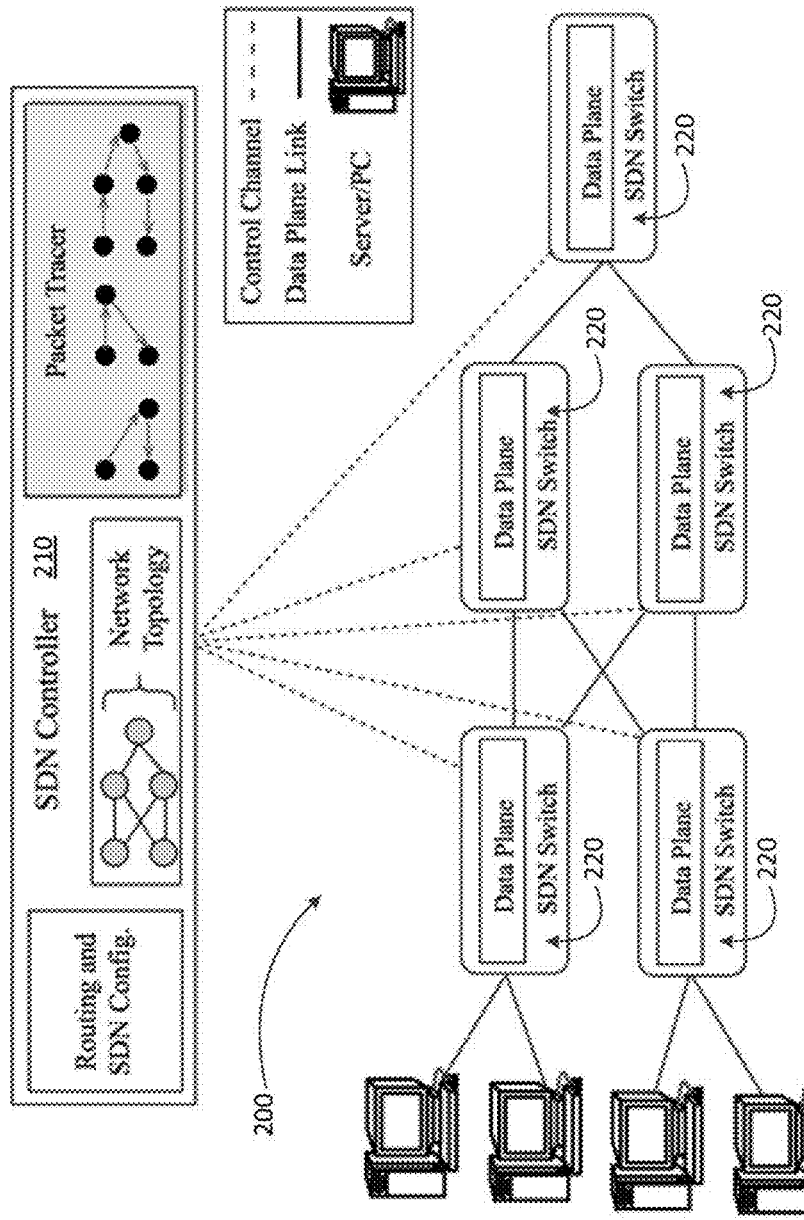
FIG. 1B depicts a representation of an exemplary SDN architecture according to one embodiment.

FIG. 1B depicts a representation of an exemplary SDN architecture 200, wherein the network control is logically centralized. High-level network functionalities that require knowledge of a network-wide state, such as traffic routing, load balancing, and topology state can be implemented as a network application in an SDN controller 210. The SDN controller 210 can translate the high-level policies/require- ments of the network applications into low-level traffic forwarding instructions and install them into SDN switches 220 as required by the application/process that is running in the SDN controller.

FIG. 1B shows an SDN controller 210 in which a packet tracer application can be implemented for an SDN environment. Embodiments herein describe an SDN application that runs on a logically-centralized SDN controller, such as SDN controller 210. The SDN application has access to one or more modules of the SDN controller such as a topology manager, and it can install specialized flow rules, referred to herein as "tracing rules" with high priority in the SDN switches 220.

As further described herein, the packet tracer application is configured to generate and install a tracing table with tracing rules into a plurality of switches of the fat-tree topology based on the switch level in the network topology, identify a source switch and a destination switch from the plurality of switches for tracing a trajectory path of a transit packet within the network, generate a probe packet with setting all bytes in the source MAC address of a probe packet-to zero, and initialize a Differentiated Services Code Point (DSCP) field of the probe packet to 16. The tracer application is also configured to inject the probe packet in the source switch via the SDN controller packet-out message, wherein the packet-out message is set to push the probe packet to a forwarding table directly.

Based on the tracing table installed by the packet tracing application, the switches in the network selectively encode the ingress port of the probe packet into the source MAC address of the probe packet when the probe packet traverses the intermediate switches in the network. The selective ingress ports are determined by the switch level in the network topology and the latest bit setting within the DSCP field and the source MAC address of the probe packet.

The packet tracing application is also configured to receive the probe packet when the probe packet reaches the destination switch, and reconstruct the trajectory path of the transit packet via encoded information in the source MAC address of the probe packet. The reconstructed trajectory path is efficiently reconstructed via the encoded selective ingress ports of one or more intermediate switches in lieu of encoding each of the ingress ports of intermediate switches that the probe packet traverses.

Conventional datacenter networks are structured in a way that enables multi-path routing techniques to forward packets/flows using the shortest paths between any pair of nodes. Nevertheless, network packets might traverse a non-shortest path during transmission due to a link failure in the path, a misconfiguration, a bug in the switch software, or deployed congestion control.

Figure 2:
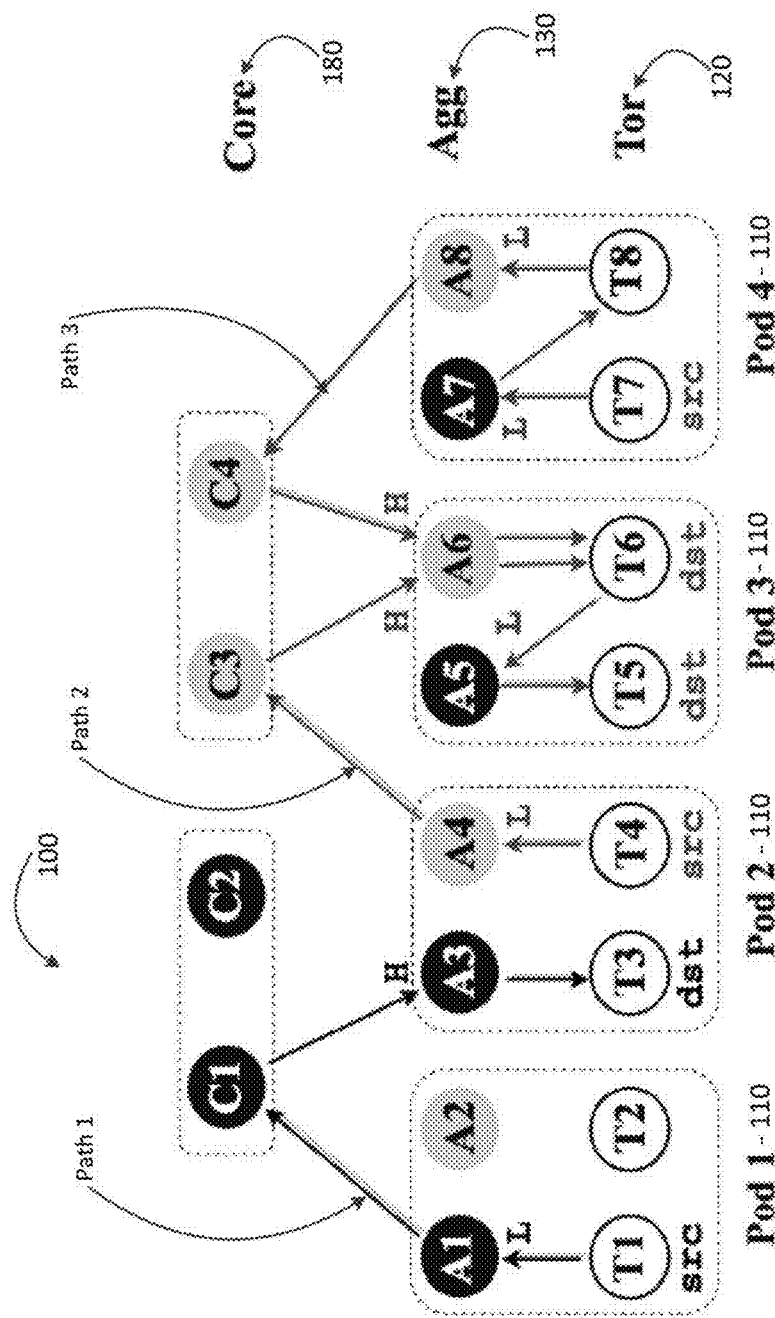
FIG. 2 illustrates three exemplary paths in the three-level fat-tree topology according to one embodiment.

FIG. 2 illustrates a path one in the three-level fat-tree topology 100, where a transit packet traverses only four hops (i.e., shortest path). However, if the transit packet encounters a link failure in the shortest path, it will be re-routed to one of the neighboring nodes that can deliver the packet to its destination.

Path two in FIG. 2 demonstrates a link failure. While the transmitted packet should be routed directly through $ToR_{SRC} \rightarrow A4 \rightarrow C3 \rightarrow A6 \rightarrow ToR_{DST}$, it was forced to traverse the longer path two, "detour path", as the link $A6 \rightarrow ToR_{DST}$ failed upon the transit packet arrival.

A misconfiguration may also create an accidental packet detouring in the network. Path three in FIG. 2 illustrates a misconfiguration example where the desirable path is $ToR_{SRC} \rightarrow A7 \rightarrow C2 \rightarrow A5 \rightarrow ToR_{DST}$ or $ToR_{SRC} \rightarrow A7 \rightarrow C1 \rightarrow A5 \rightarrow ToR_{DST}$. Nonetheless, A7 forwarded the transit packet back to one of the ToR switches 120 instead of forwarding the packet to C1 or C2, as the packet destination is not in the same pod 110.

In an SDN-enabled datacenter, there are different network applications and protocols running simultaneously, such as congestion control, fault-tolerant routing, and traffic monitoring applications, and they may accidentally interrupt each other at one or more points in the network. Therefore, tracing the transit packet trajectory for a debugging process helps to determine the network forwarding behavior, localize the unpredicted network faults, and optimize the routing performance, especially in datacenter networks, where multiple path routing is often deployed.

Embodiments described herein build upon three observations. First, Layer-3 of the packet headers is used instead of Layer-2 for forwarding traffic in order to enable multi-path routing in the network. Second, unlike the traditional routers, network devices described herein do not change any fields of the packet headers (e.g., source/destination MAC addresses and TTL) unless explicitly instructed by the SDN controller to do so. Third, the fat-tree topology is used herein because it is neatly structured. Although there are many redundant paths between any ToR switch pairs, there is only one link between the ToR switch and each Agg switch in the same pod, and only one link between the Agg switch and each Core switch located in a certain Core segment. If each ToR switch in the pod is connected to the Agg switches in a cyclic permutation order, it is easy to trace the packet's path by only knowing the ingress port number of each switch traversed by that transit packet.

Embodiments herein for an SDN application proactively install the tracing rules in the network switches. These tracing rules selectively encode the above-mentioned ingress port numbers into the source MAC address of the traced packet along its path. Since the Layer 3 header is used for routing and load balancing purposes, the Layer 2 header is used (i.e., source MAC address) for encoding the path of the transit packet.

Embodiments described herein do not require packet tagging as it utilizes packet header rewriting features of OpenFlow. The number of tracing rules installed is negligible, compared to PathletTracer and CherryPick. As a result, these rules can be installed when the packet tracer application is first configured and they do not need any updates, even if the topology size changes (e.g., added/removed switches).

Figure 3A:
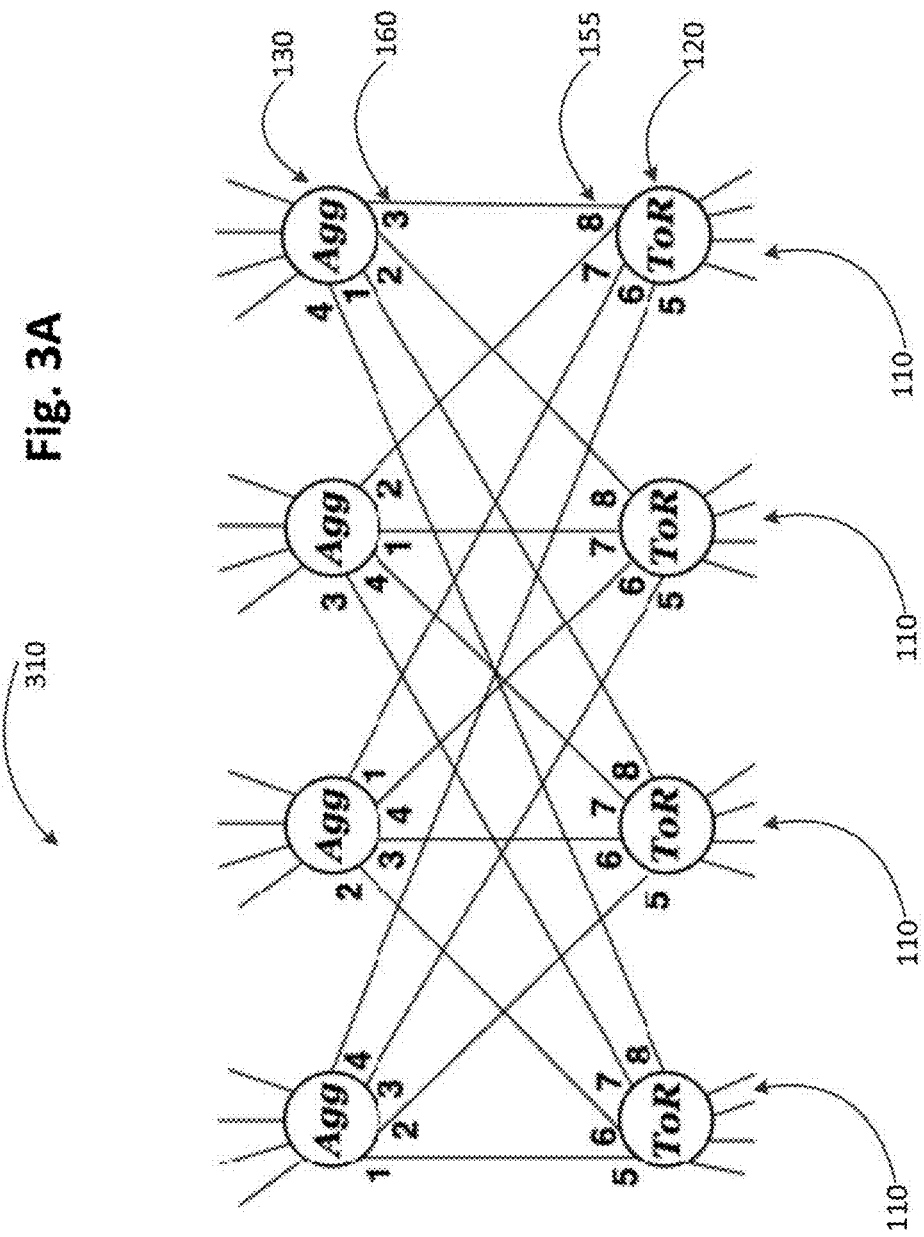
FIG. 3A illustrates exemplary intra-pod links in an 8-ary fat-tree topology according to one embodiment.

As mentioned above, rearranging the intra-pod links (i.e., links between ToR switches 120 and Agg switches 130 in each pod 110) in cyclic permutation fashion smooths the path tracing process of the transit packet. FIG. 3A illustrates exemplary intra-pod links 310 in an 8-ary fat-tree topology after the rearranging in cyclic permutation fashion. Let the lower port numbers L 160 of each Agg switch 130 be a finite set L={l$_0$, l$_1$, . . . , l$_{(k-2)/2}$}, indexed by $$i = \left\{0, 1, \ldots \frac{k-2}{2}\right\},$$

where l$_i$=i+1. The remaining port numbers 155 of each ToR switch 120 connect to the lower port numbers 160 of all Agg switches 130 in the same pod 110 (from left to right) in a cyclic permutation order based on the following:

$$\pi(l_i) = l_{(i+f)(\mod(k/2))} \tag{1}$$

where $$f = \left\{0, 1, \ldots \frac{k-2}{2}\right\},$$

is a shift integer for the cyclic permutation, and it is assigned to Agg switches 130, located in the same pod 110, from left to right in ascending order.

The network operator needs only to specify the desired source and destination hosts to trace the path of the transit packet between them. The packet tracer application uses this information to obtain the attachment points for the hosts from the topology module of the SDN controller (i.e., the source and destination ToR switches with port numbers where these hosts are connected). After identifying the source and destination ToR switches, the packet tracer application injects a probe packet in the source ToR switch via a PACKET_OUT message. All the bytes in the source MAC address of the probe packet are set to zero in order to enable path encoding.

The action for the PACKET_OUT message is set to GOTO-table, which pushes the probe packet to the forwarding table directly. Also, the input port in the PACKET_OUT message is set to the port number where the source host is connected in the source ToR switch. This causes the forwarding table in the source switch to treat the probe packet as normal traffic. When the probe packet reaches the destination ToR switch, it will be sent back to the SDN controller via a PACKET_IN message. The SDN application installs a specific matching flow entry in the main table of the destination ToR switch with an adequate idle-timeout for this task. The main table is the table number zero in an OpenFlow pipeline processing. Moreover, the SDN application initially sets the Differentiated Services Code Point (DSCP) field of the probe packet's IP header to 16, so the intermediate switches in the path can identify the packet as a data-plane probe packet and direct it to the tracing table before processing the probe packet in the forwarding table.

The SDN application carefully installs the tracing rules in a separate table, named herein as "tracing table", which is placed between the main table and the forwarding table in the OpenFlow pipeline processing. This enables applying certain actions on the probe packets (e.g., encoding the ingress port number in the packet header) before forwarding them, and ensures that the observation validity of the switch forwarding behavior is not affected.

The tracing rules encode the ingress port of the received probe packet into a First Available Zero Byte (FAZB) of the probe packet's source MAC. OpenFlow allows use of a bitmask with MAC addresses, and the packet tracing application sets all the bytes of the probe packet's source MAC to zero before injecting it into the network. Thus, six flow entries are needed in the tracing table (i.e., for the matching process) to find the FAZB. FIG. 3B illustrates a bitmask of the flow entries represented by a diagonal matrix M.

S The MAC address is only six bytes, therefore n=6. The element of the matrix m$_{ij}$=(b$_{ij}$)δ$_{ij}$, where i denotes the position of the byte in source MAC address, j denotes the number of the tracing rule in its table, and the constant b=0xff in hexadecimal. Therefore, m$_{ij}$=0 if i≠j ∀i, j∈{1, 2, . . . , n}.

FIG. 4 illustrates exemplary first and last OpenFlow tracing rules 400 installed in the tracing table with corresponding highlighting of the bitmask mentioned above for each rule. In this example, the rule with the highest priority gets matched first, and the priority of the rules is organized in descending order for the matching process. For instance, if the first byte of the probe packet's source MAC is zero, the first rule will be applied so that it will copy the input port number where the probe packet was received into the first byte.

Based on the structure of fat-tree topology and the cyclic permutation discussed herein, the path that was taken by the probe packet can be easily discovered without the need to encode the ingress port of the first intermediate ToR switch or the first Core switch (i.e., any ToR switches in the path other than the source and destination ToR switches are intermediate switches). The packet tracer application utilizes this fact to selectively encode only the essential ingress ports of the intermediate switches in such a way that reveals the path of the transit probe packet. The ingress port encoding mechanism at each switch level is described herein.

Figure 5A:
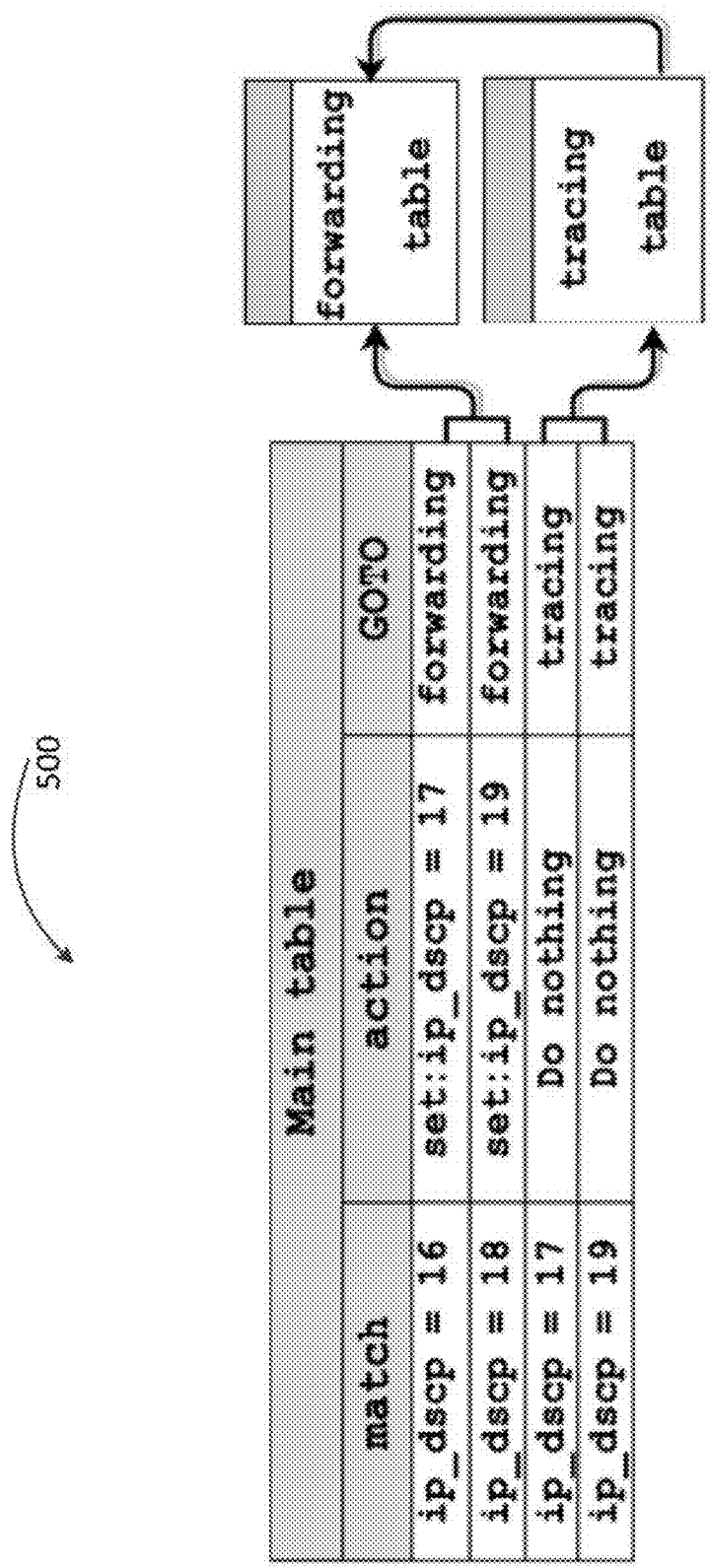
FIG. 5A illustrates the flow rules to be installed in the main table of the Top-of-Rack switches according to one embodiment.

ToR:

If the intermediate ToR switch receives a probe packet with DSCP equal to 16 or 18, it sets the first bit of DSCP to 1 and pushes the probe packet directly to the forwarding table. If another intermediate ToR switch in the network receives the probe packet that has DSCP equal to 17 or 19, the probe packet will be directed to the tracing table so that the ingress port will be encoded. FIG. 5A illustrates four flow rules to be installed in a main table 500 of the ToR switches for directing the traced probe packet in OpenFlow pipeline processing of the ToR switch.

Figure 5B:
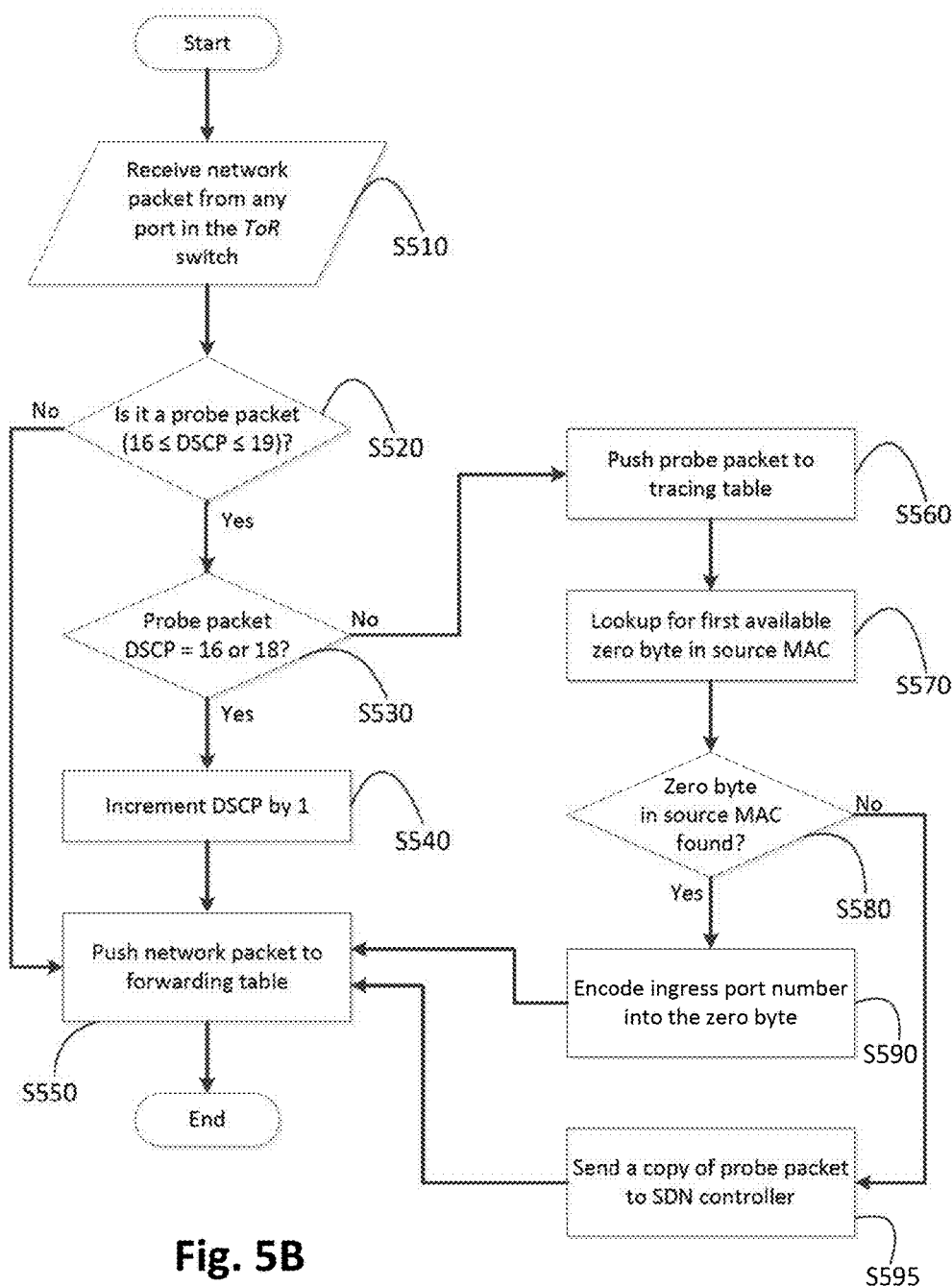
FIG. 5B is a flowchart of an exemplary operation of the Top-of Rack switch when performing a tracing operation according to one embodiment.

FIG. 5B is a flowchart outlining an exemplary operation of the ToR switch when performing a tracing operation after it is configured with tracing rules. In step S510, a network packet is received from one of the ports in the ToR switch.

In step S520, it is determined whether the received network packet is a probe packet. If the DSCP field in the received network packet has a value between 16 and 19 inclusive, the network packet is classified as a probe packet (a "YES" decision in step S520), and the process proceeds to step S530. If the received network packet is not a probe packet (a "NO" decision in step S520), the process proceeds to step S550, which will be described in further detail herein.

In step S530, it is determined whether the DSCP field of the probe packet is equal to 16 or 18. If the DSCP field of the probe packet is equal to 16 or 18 (a "YES" decision in step S530), the process proceeds to step S540. If the DSCP field of the probe packet is not equal to 16 or 18 (a "NO" decision in step S530), the process proceeds to step S560, which will be described in further detail herein.

In step S540, the DSCP is incremented by 1, and the process proceeds to step S550. In step S550, the network packet is pushed to the forwarding table and the process subsequently ends.

When the DSCP field of the probe packet is not equal to 16 or 18 (a "NO" decision in step S530), the process proceeds to step S560. In step S560, the probe packet is pushed to the tracing table, and the process proceeds to step S570.

In step S570, lookup for the first available zero byte in the source MAC is performed. In step S580, it is determined whether the zero byte in the source MAC is found. If the zero byte is found (a "YES" decision in step S580), the process proceeds to step S590. In step S590, the ingress port number is encoded into the zero byte. The process proceeds to step S550 and the process subsequently ends.

If the zero byte is not found (a "NO" decision in step S580), the process proceeds to step S595. In step S595, a copy of the probe packet is sent to the SDN controller. The process proceeds to step S550 and the process subsequently ends.

Core:

If a Core switch receives a probe packet with DSCP equal to 16 or 17, it sets the second bit of DSCP to 1 and pushes the probe packet to the forwarding table. If another Core switch in the network receives that probe packet, it will direct the probe packet to the tracing table so that the ingress port will be encoded.

Figure 6A:
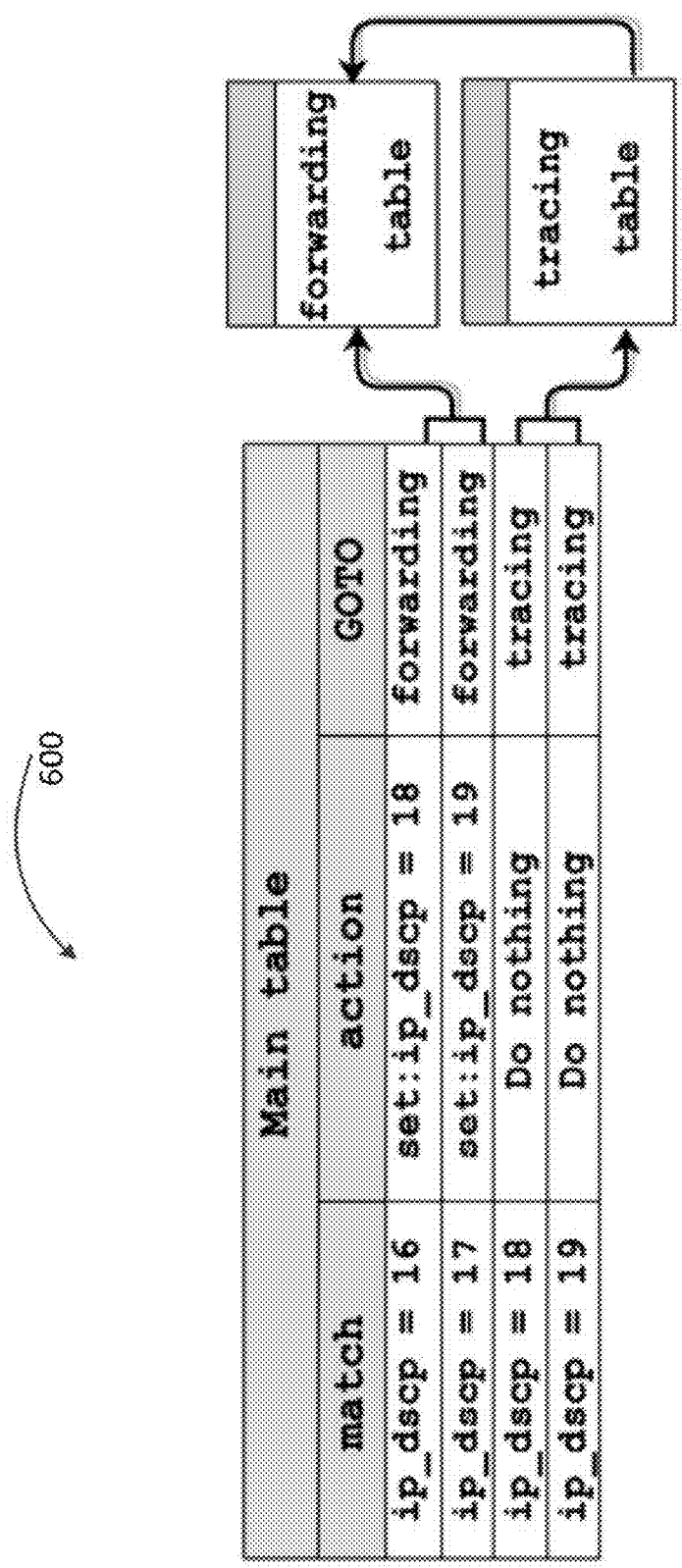
FIG. 6A illustrates the flow rules to be installed in the main table of the Core switches according to one embodiment.

FIG. 6A illustrates four flow rules installed in a main table 600 of the Core switches for directing the traced probe packet in OpenFlow pipeline processing of the Core switch.

Figure 6B:
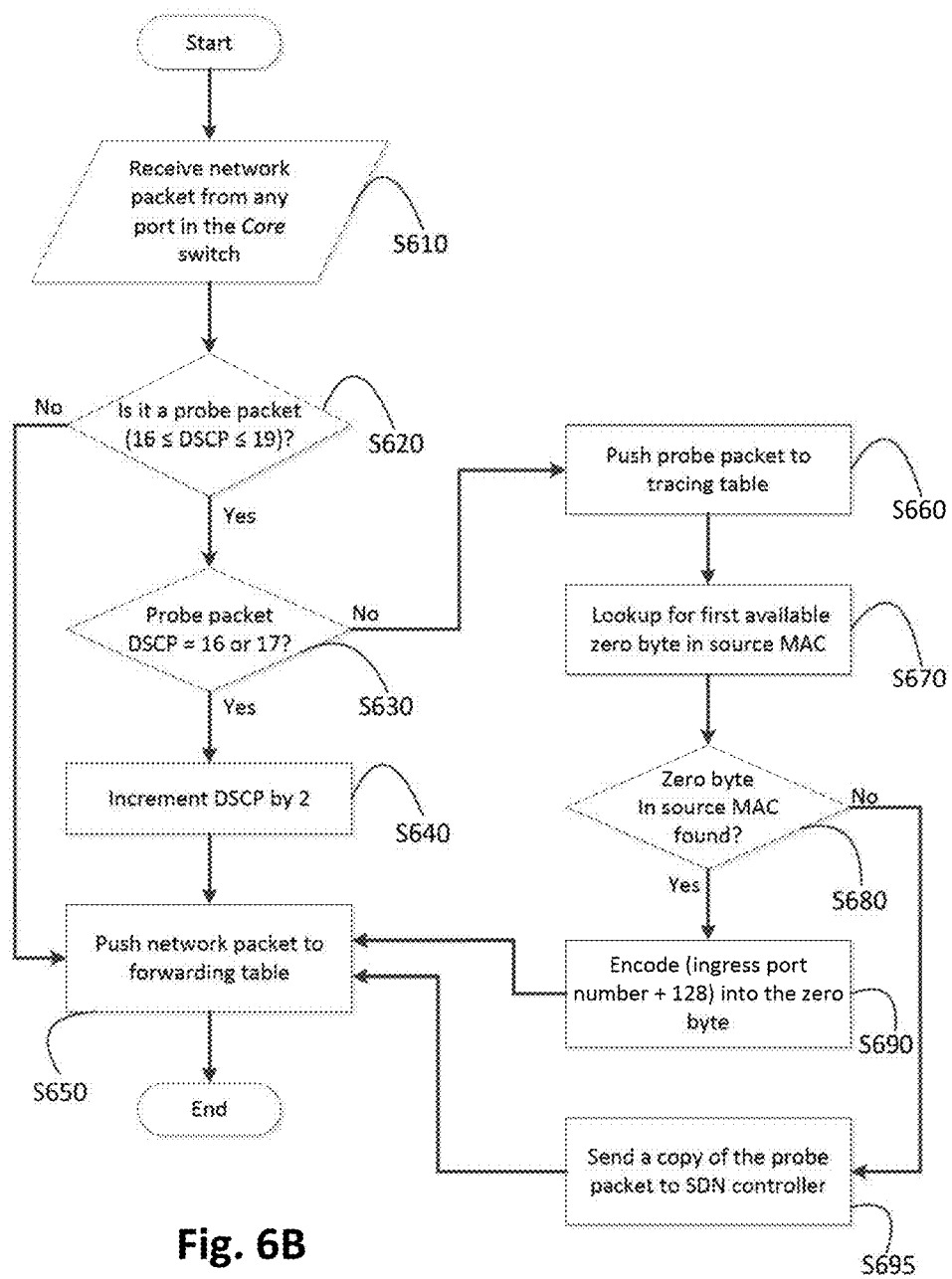
FIG. 6B is a flowchart of an exemplary operation of the Core switch when performing a tracing operation according to one embodiment.

FIG. 6B is a flowchart illustrating an exemplary operation of the Core switch when performing a tracing operation after it is configured with tracing rules. In step S610, a network packet is received from one of the ports in the Core switch.

In step S620, it is determined whether the received network packet is a probe packet. If the DSCP field in the received network packet has a value between 16 and 19 inclusive, the network packet is classified as a probe packet (a "YES" decision in step S620), and the process proceeds to step S630. If the network packet is not a probe packet (a "NO" decision in step S620), the process proceeds to step S650, which will be described in further detail herein.

In step S630, it is determined whether the DSCP field of the probe packet is equal to 16 or 17. If the DSCP field of the probe packet is equal to 16 or 17 (a "YES" decision in step S630), the process proceeds to step S640. If the DSCP field of the probe packet is not equal to 16 or 17 (a "NO" decision in step S630), the process proceeds to step S660, which will be described in further detail herein.

In step S640, the DSCP is incremented by 2, and the process proceeds to step S650. In step S650, the network packet is pushed to the forwarding table and the process subsequently ends.

When the DSCP field of the probe packet is not equal to 16 or 17 (a "NO" decision in step S630), the process proceeds to step S660. In step S660, the probe packet is pushed to the tracing table, and the process proceeds to step S670.

In step S670, lookup for the first available zero byte in the source MAC is performed. In step S680, it is determined whether the zero byte in the source MAC is found. If the zero byte is found (a "YES" decision in step S680), the process proceeds to step S690. In step S690, 128 is added to the ingress port number and the total number is encoded into the zero byte. The process proceeds to step S650 and the process subsequently ends.

If the zero byte is not found (a "NO" decision in step S680), the process proceeds to step S695. In step S695, a copy of the probe packet is sent to the SDN controller. The process proceeds to step S650 and the process subsequently ends.

Figure 7:
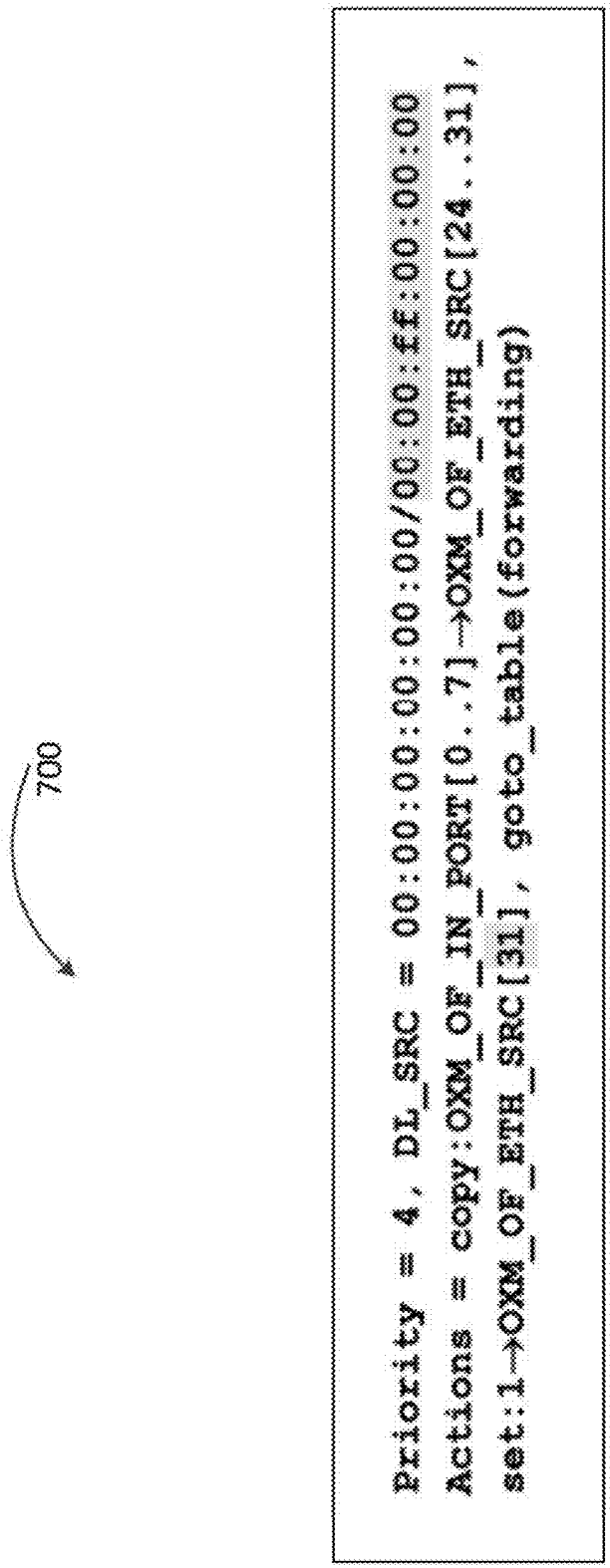
FIG. 7 illustrates an exemplary OpenFlow tracing rule for Core switch according to one embodiment.

The tracing rules installed in the tracing table of the Core switch are slightly different from the rules in FIG. 4. In order to distinguish between intra-pod links and core-pod links, the tracing rules in Core switches add 128 to the encoded ingress port number by setting the Most Significant Bit (MSB) of the FAZB to 1. FIG. 7 illustrates an exemplary OpenFlow tracing rule 700 for the Core switch that encodes the packet ingress port into the third byte of its source MAC.

Agg:

All Agg switches in the network direct any packets to the tracing table if $16 \leq DSCP \leq 19$.

All of the switches (ToR, Agg, and Core) have four flow rules installed in the main table for directing the probe packets in the OpenFlow pipeline processing. Moreover, Agg switches have six tracing rules presented in FIG. 4, whereas Core and ToR switches have only four tracing rules since the first Core switch and the first intermediate ToR switch do not encode the ingress port in the probe packet's source MAC address.

The probe packet will be sent to the SDN controller when it reaches the destination ToR switch, so its path can be reconstructed according to the encoded information in its source MAC address.

The reconstruction steps of the path taken by a probe packet through simulating different packet trajectory scenarios in a fat-tree topology are described herein. For ease of illustration, the port numbers at the ToR and Agg switches are divided into two categories: i) H denotes a port number >(k/2) and ii) L denotes a port number ≤(k/2). The encoded port for a Core switch in the source MAC has a value >128 since Core switches set the MSB of FAZB to 1. Since these encoded ports are distinguishable, Z is used to denote a port number that belongs to a Core switch.

Four Hops:

The shortest path(s) between any two ToR switches in different pods traverse(s) only four hops. If the probe packet takes the shortest path, two ingress ports will be encoded in its source MAC. The first ingress port is at the $Agg_{src}$ switch in the source pod, and the second ingress port is at the $Agg_{dst}$ switch in the destination pod. The Agg switch and the $Agg_{dst}$ switch are located at the same position in their pods. Path one in FIG. 2 illustrates an example of the 4-hop path in a fat-tree topology. If a probe packet traverses such a path, its source MAC address will be L:H:00:00:00:00. The L value indicates the first link in the path $ToR_{SRC}$→A1, and the H value indicates the probe packet traversed C1. Moreover, the PACKET_IN message sent from the destination ToR switch to the controller includes the ingress port number where the probe packet was received. Therefore, the SDN controller knows the last link in the probe packet's path. As a result, path one: $ToR_{SRC}$→A1→C1→A3→$ToR_{DST}$ is easily reconstructed.

Six Hops:

In path two and three of FIG. 2, both paths have six hops. The source MAC address for a probe packet that traverses path two will be L:H:L:00:00:00, while it will be L:L:H:00:00:00 if the probe packet traverses path three. For path two, the first L reveals the first link in the path $ToR_{SRC}$→A4. The second byte has an H value, which indicates that after the probe packet exits the source pod, it reaches the destination pod through an Agg switch that has the same position of A4. (i.e., the second Agg switch from the left in the destination pod). Therefore, it can be determined that H is the ingress port of the link C3→A6.

Since the SDN controller knows the last (intermediate) switch preceding the $ToR_{DST}$ from PACKET_IN message, it can be determined that the last link in the probe packet's path is A5→$ToR_{DST}$. Since there are only three encoded values in the source MAC and none of them are ≥128, this indicates that all the encoded ingress ports belong to Agg switches located in the source and destination pods.

Table 1 lists the types of participating switches in the encoding process for different path lengths. As indicated, the last L value in the source MAC belongs to A5 and its value reveals the intermediate ToR switch between A6 and A5. Therefore, the path $ToR_{SRC}$→A4→C3→A6→T6→A5→$ToR_{DST}$ is completely traced.

TABLE 1

PARTICIPATING SWITCHES IN THE ENCODINC PROCESS

| No. | Encoded | Core Involved | Total Hops | Participating Hops |
|---|---|---|---|---|
| 1 | 1 | No | 2 | 1 Aggregate |
| 2 | 2 | No | 4 | 2 Aggregate |
| 3 | 3 | No | 6 | 3 Aggregate |
| 4 | 4 | No | 6 | 3 Aggregates and 1 ToR |
| 5 | 4 | One | 6 | 3 Aggregates and 1 Core |
| 6 | 5 | No | 8 | 4 Aggregates and 1 ToR |
| 7 | 5 | One | 8 | 4 Aggregates and 1 Core |
| 8 | 6 | No | 8 | 4 Aggregates and 2 ToRs |
| 9 | 6 | Two | 8 | 4 Aggregates and 2 Cores |
| 10 | 6 | — | ≥10 | message to controller |

In path three, the first encoded L is followed by another encoded L. Such an encoded pattern occurs when the probe packet is detoured in the same pod and traverses two Agg switches. The first L value is known to be Agg (A7) switch, but finding the second Agg switch entails backtracking the probe packet's path.

FIG. 8 illustrates Algorithm 1, which describes the backtracking steps for different path lengths. First, the last two links C4→A6→$ToR_{DST}$ are reconstructed (lines 4 and 14 in Algorithm 1). The second Agg (A8) switch in the source pod can now be located since the second L is followed by H (lines 27-29 in Algorithm 1). Thereafter, the intermediate ToR (T8) switch between A7 and A8 can be ascertained based on the value of the second L in the source MAC address (line 32 in Algorithm 1).

Figure 9A:
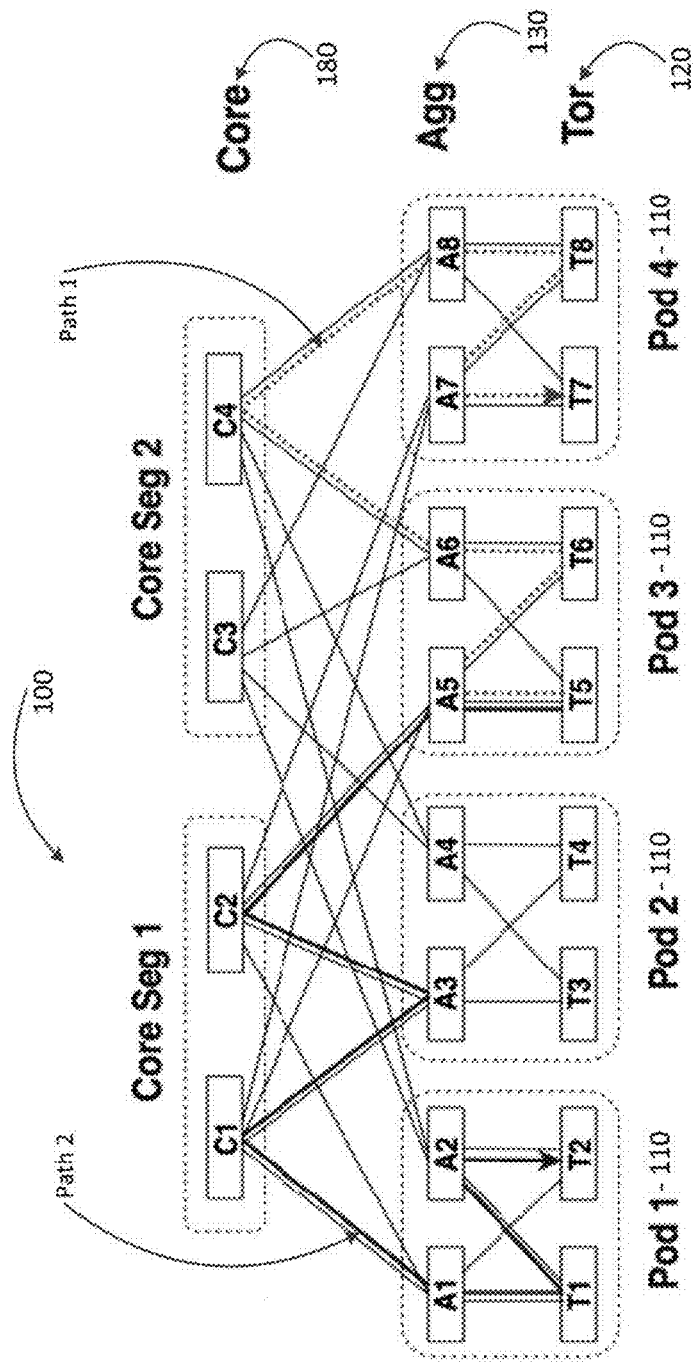
FIG. 9A illustrates two exemplary paths in the fat-tree topology according to one embodiment.

Eight Hops:

FIG. 9A illustrates two exemplary paths in the fat-tree topology 100. Path one and path two have eight hops, but they illustrate different packet trajectories. If the probe packet traverses path one, its source MAC address will be L:L:H:H:L:00, which matches the sixth case in Table 1. However, the probe packet's source MAC will be L:H:Z:H:L:00 if it takes path two, which matches the seventh case in Table 1. The encoded ports in path one form a distinct pattern since the first pair of bytes has L values and the second pair of bytes has H values. This indicates that the probe packet was detoured twice, the first time in the source pod and the second time in the destination pod. Also, this indicates that the probe packet has traversed two Agg switches 130 and one intermediate ToR switch 120 in each pod 110. The first intermediate ToR switch 120 in the probe packet's path does not encode the ingress port, so the last three encoded values in the probe packet's source MAC belong to the Agg switches 130 and the ToR switches 120 in the destination pod 110. Hence, the last four links C4→A8→T8→A7→$ToR_{DST}$ can be reconstructed (lines 4-17 in Algorithm 1). Since the second L in the source MAC is followed by Hi (i.e., at this stage of the tracing process, it is ascertained that H belongs to A8), the second Agg (A6) switch 130 can be located in the source pod 110 (lines 19-21 in Algorithm 1). From the second L value, the intermediate ToR (T6) switch 120 in the source pod 110 can be determined, and the first L value reveals the first Agg (A5) switch 130 in the probe packet's path.

For path two in FIG. 9A, the encoded Z in the probe packet's source MAC implies that the probe packet traversed two Core switches 180, and it might visit an intermediate pod 110 before reaching the destination pod 110. In this case, a first step is to determine the location of probe packet detouring in the path. Since the last two encoded ports have H and L values respectively, it is known that the probe packet was detoured in the destination pod 110. Therefore, the first three Agg switches 130 visited by the probe packet are located at the same position in their pods 110. After finding the intermediate ToR (T1) switch 120 based on the last L value in the source MAC, the third Agg (A1) switch 130 in the probe packet's path can be determined (lines 9-11 in Algorithm 1) since the SDN controller already knows the first Agg (A5) switch 130. The last encoded H reveals the second Core (C1) switch 180 in the path. Subsequently, it is known that Z belongs to C1 and its value points out to A3. Finally, the first H in the source MAC identifies the link C2→A3.

Figure 9B:
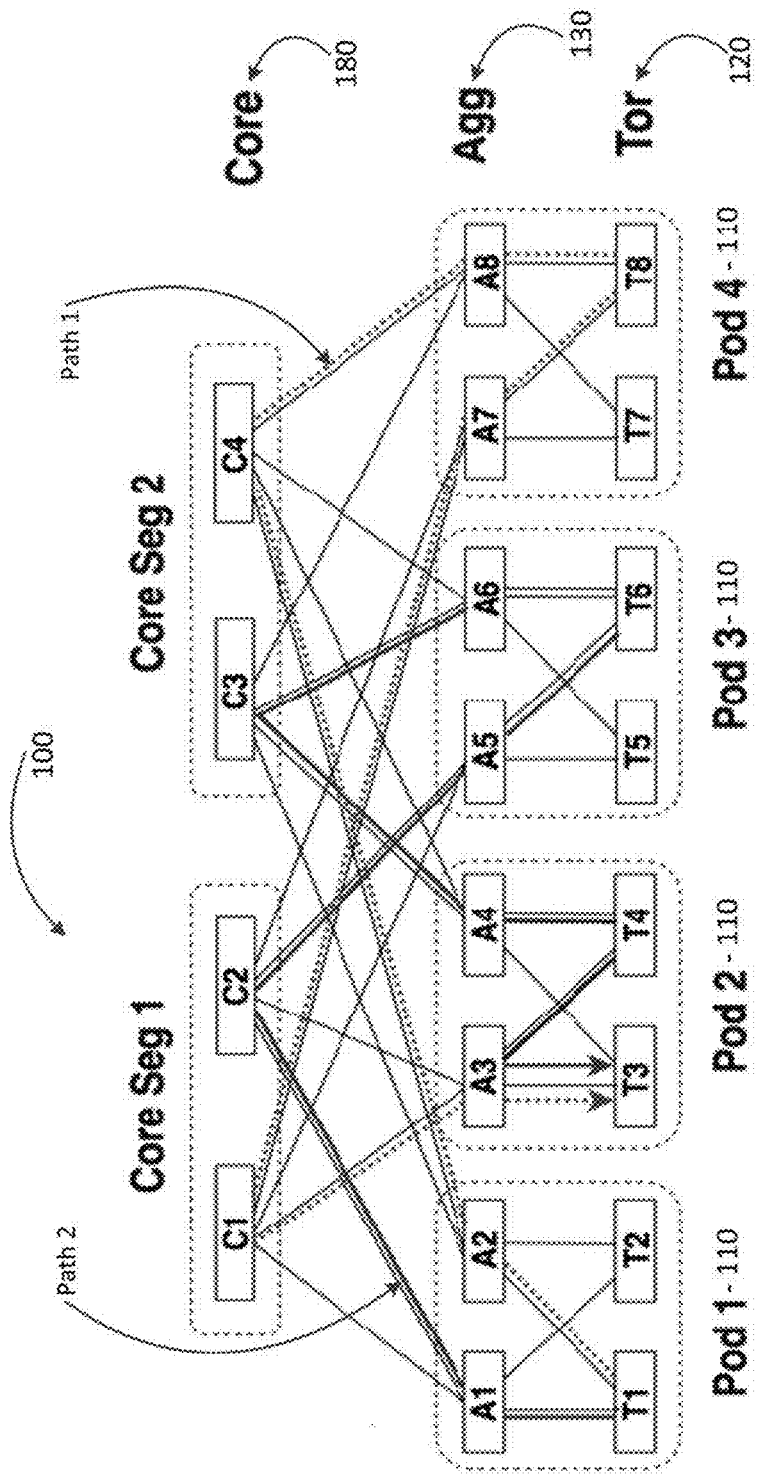
FIG. 9B illustrates a complex packet tracing scenario in the fat-tree topology according to one embodiment.

FIG. 9B illustrates a complex packet tracing scenario in the fat-tree topology 100, where the probe packet visits a ToR switch 120 located in a pod 110 other than the source and destination pods 110. If the probe packet traverses path one in FIG. 9B, its source MAC will be L:H:L:Z:H:00. The first link $ToR_{SRC}$→A2 is found from the first L, which is followed by H. This indicates that the probe packet reached another Agg switch 130 located in a different pod, 110. Since the probe packet has traversed two Core switches 180 (i.e., encoded Z value), the $pod_d$ 110 could either be the destination pod 110 or just another pod 110 in the network. The location of the $Agg_d$ switch 130 in its $pod_d$ 110 is known based on the A2 position, but $Agg_d$ switch 130 and $pod_d$ 110 are not identified yet. Therefore, the backtracking process is started.

From the PACKET_IN message and the last encoded H value, the last two links C1→A3→$ToR_{DST}$ can be discovered. Hence, it is known that Z belongs to C1 and its value points out to A7. The second L in the source MAC identifies the link T8→A7. At this stage of the tracing process, it is known that $pod_d$ 110 is the pod number four and $Agg_d$ switch 130 is A8. Thus, the first H is identified in the source MAC as an ingress port at A8 (lines 22-24 in Algorithm 1) and its value points to the first Core switch 180 (C4) in the path between A2 and A8. Following these steps, the traced path one $ToR_{SRC}$→A2→C4→A8→T8→"A7→C1→A3→$ToR_{DST}$ is fully reconstructed.

Ten Hops:

Path two in FIG. 9B illustrates a probe packet traversing $ToR_{SRC}$→A1→C2→A5→T6→A6→C3→A4→T4→A3→$ToR_{DST}$. By the time the probe packet reaches A3, all the bytes in its source MAC have been consumed since it has visited four Agg switches 130, two Core switches 180, and two ToR switches 120. Consequently, none of the tracing rules at A3 will be applied, but the table-miss flow entry will send a copy of the probe packet to the SDN controller. Each flow table has a miss flow entry to specify how to process packets unmatched by other flow entries in the table. When a tracing table is installed in a switch, the miss entry of that table is configured to simultaneously send an unmatched packet to the forwarding table and the SDN controller (steps S595 and S695). In this case, the SDN controller will receive two PACKET_IN messages. The first message will be sent from A3, which can be used to find the first eight hops visited by the probe packet before it reaches A3 (see the 8-hop path reconstruction discussed herein). The second PACKET_IN message from the $ToR_{DST}$ switch confirms that A3 is the last intermediate switch in the path.

Embodiments described herein were evaluated in terms of required flow rules and packet header space against conventional techniques of PathletTracer and CherryPick.

PathletTracer requires installing a number of flow rules at each switch linearly in the number of paths in which the switch resides. As a result, the required flow rules depend on path length and network size. In the fat-tree topology, which has a large number of redundant paths between any pair of edge switches, the PathletTracer flow rules increase dramatically in tracing non-shortest paths.

Figure 10A:
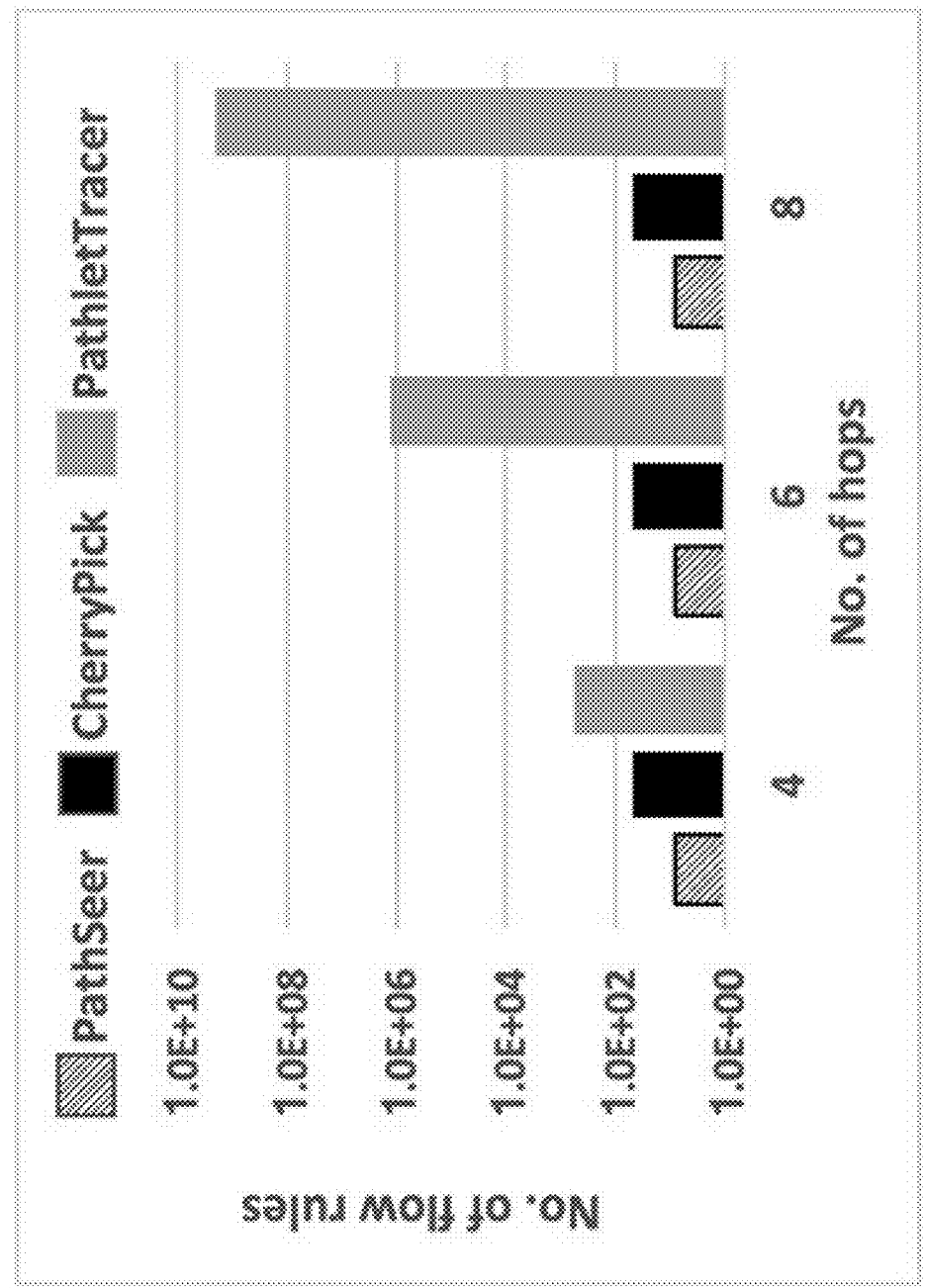
FIG. 10A is a logarithmic plot for a Top-of-Rack switch level according to one embodiment.
Figure 10B:
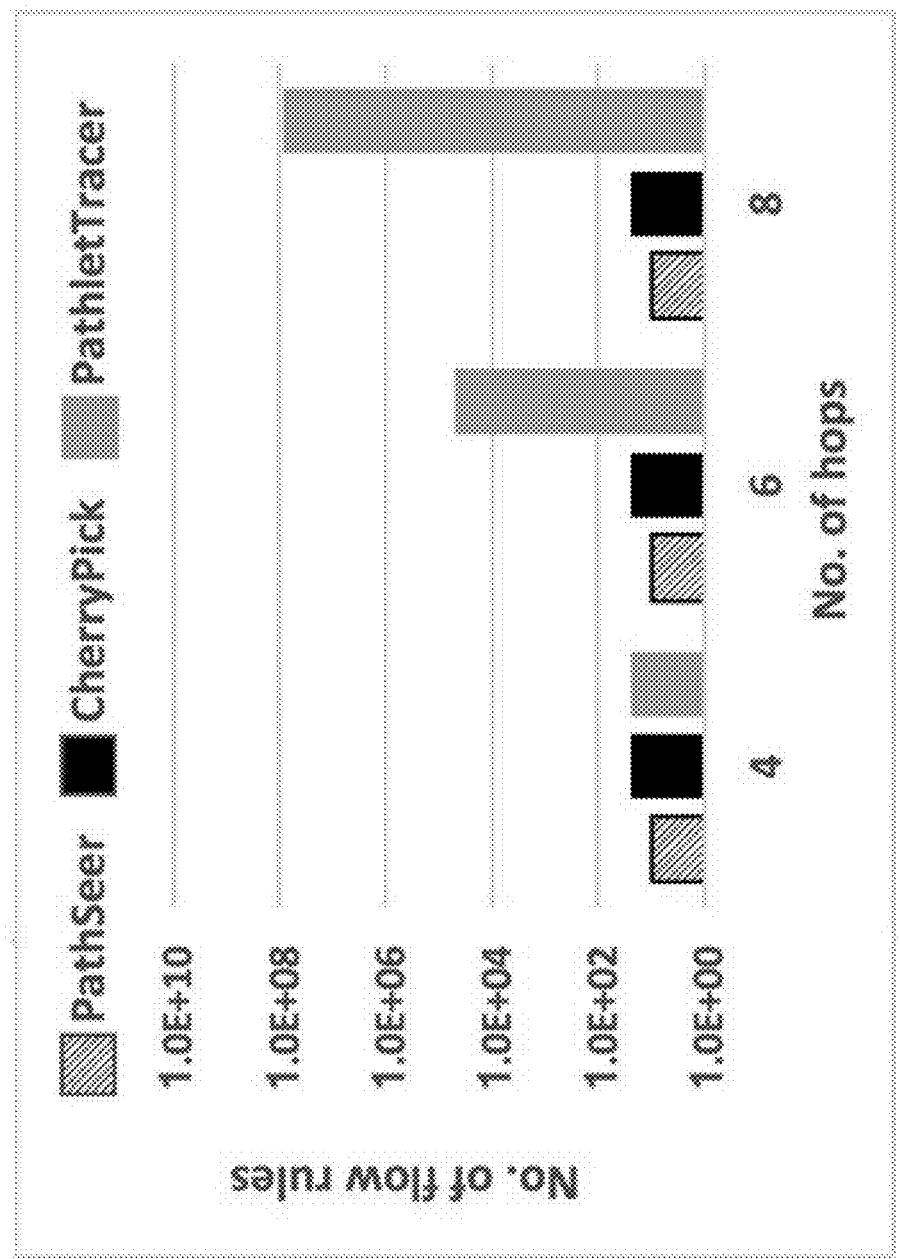
FIG. 10B is a logarithmic plot for Aggregate switch level according to one embodiment.
Figure 10C:
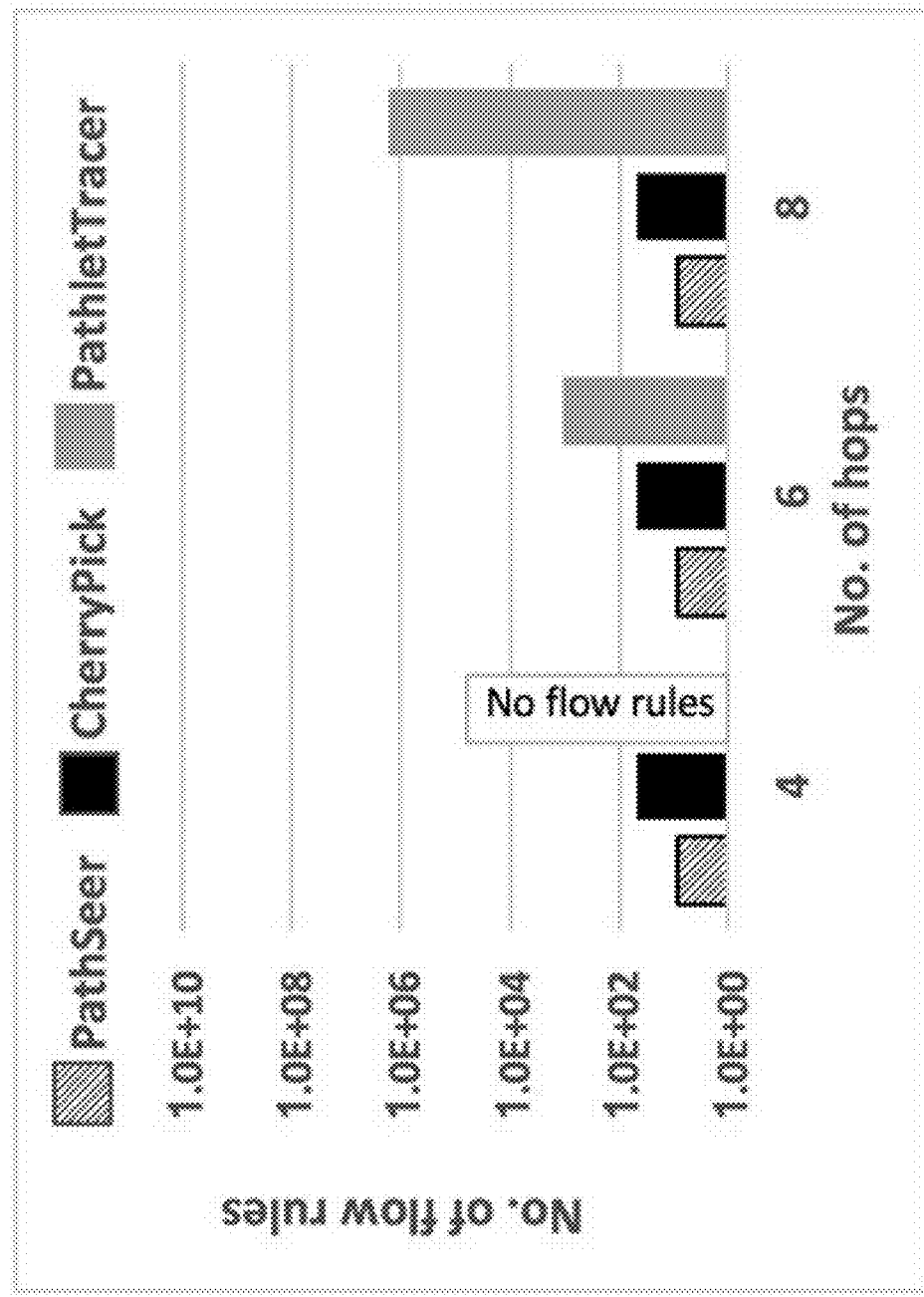
FIG. 10C is a logarithmic plot for Core switch level according to one embodiment.

FIG. 10A is a logarithmic plot for ToR switch level, FIG. 10B is a logarithmic plot for Agg switch level, and FIG. 10C is a logarithmic plot for Core switch level for CherryPick and PathletTracer, as compared to embodiments described herein as PathSeer. Each plot illustrates how large the number of flow rules installed by PathletTracer is at each switch level in a 48-ary fat-tree topology, especially in tracing 6-hop and 8-hop paths (i.e., non-shortest paths in the three-level fat-tree).

CherryPick significantly minimizes the required flow rules and installs as many flow rules as the number of ports present at a switch. In the 48-ary fat-tree topology, CherryPick installs 48, 24, and 48 flow rules in ToR, Agg, and Core switch levels, respectively. However, some packet trajectories such as path one and path two in FIG. 9 cannot be traced via CherryPick.

In contrast, embodiments described herein (identified as PathSeer) further minimize the required flow rules for the tracing process. PathSeer installs only 8, 10, and 8 flow rules in ToR, Agg, and Core switch levels, respectively. Unlike CherryPick, the PathSeer flow rules are independent of the topology size (i.e., switch port density in the fat-tree topology) and the network subnetting scheme.

Figure 11:
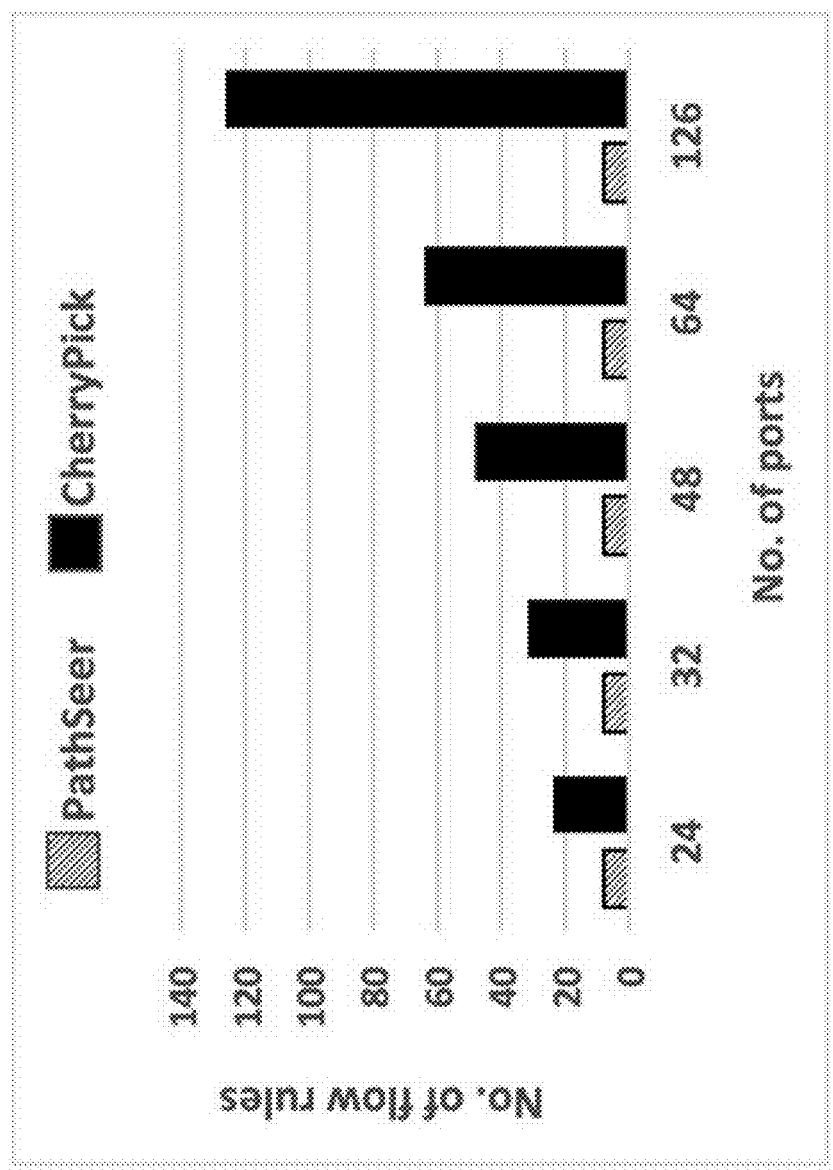
FIG. 11 is a graph comparing the installed flow rules by CherryPick and PathSeer for a (Core switch with different port density according to one embodiment.

FIG. 11 is a graph comparing the installed flow rules by CherryPick and PathSeer for a Core switch with different port density based on the size of the fat-tree topology. As illustrated in FIG. 11, the number of flow rules required by PathSeer remains invariant, whereas it increases linearly with the number of switch ports in CherryPick.

CherryPick utilizes an edge-coloring algorithm of a complete bipartite graph to assign a unique identifier for each intra-pod and core-pod link in the fat-tree topology. Consequently, there are a total of $3k^2/4$ unique link identifiers, which require $[\log(3k^2/4)]$ bits to represent each link (i.e., k is the switch port density in a fat-tree topology). CherryPick leverages VLAN tagging to embed the ingress link identifier in the traced packet header. Tracing any n-hop path (n≥4) via CherryPick requires inserting (n−2)/2 VLAN tags, which increases the packet header. For example, CherryPick inserts four VLAN tags when it traces a 10-hop path (i.e., 16 bytes added to the packet header), whereas PathSeer only modifies six bytes in the packet header (source MAC) for supporting similar functionality.

Figure 12:
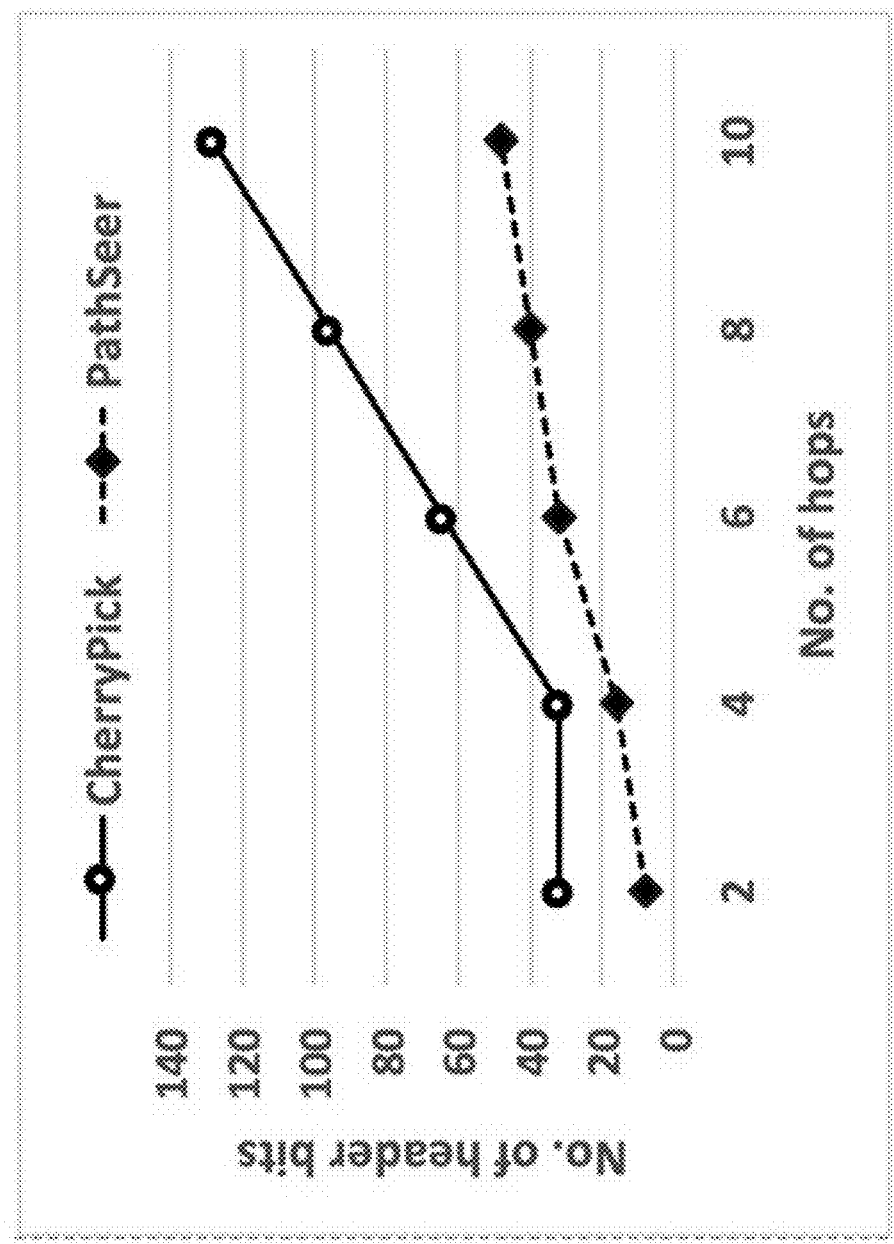
FIG. 12 is a graph comparing the inserted bits by CherryPick and the modified bits by PathSeer according to one embodiment.

FIG. 12 is a graph comparing the inserted bits by CherryPick and the modified bits by PathSeer for tracing n-hop paths. As illustrated, a much larger number of bits is required for CherryPick.

Figure 13:
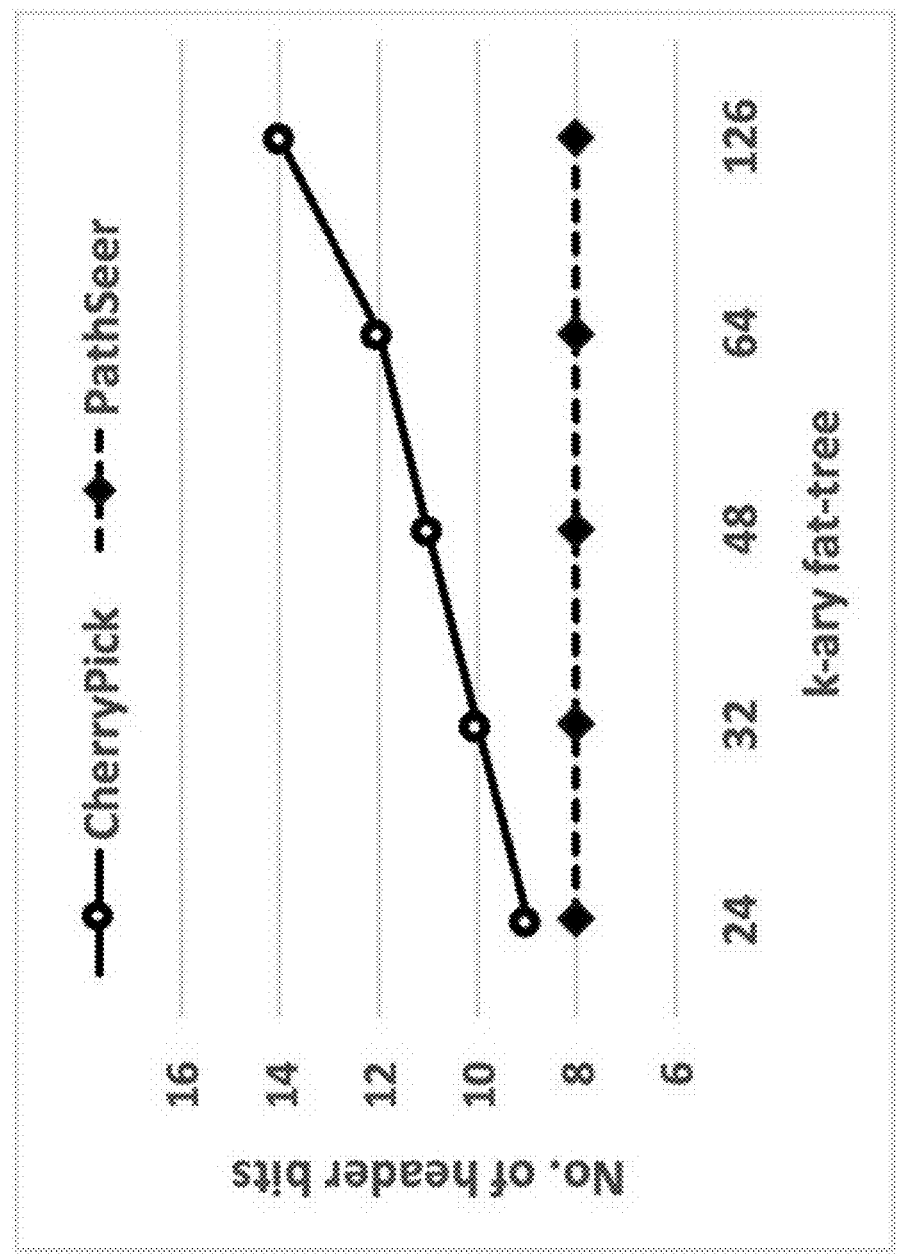
FIG. 13 is a graph illustrating the results of PathSeer modifying one byte in the packet header per selected hop according to one embodiment.

FIG. 13 is a graph illustrating results of PathSeer invariably modifying one byte in the packet header per selected hop, which is independent of the topology size. In contrast, the size of the link identifier in CherryPick depends on the switch port density (k) in a fat-tree topology. Moreover, CherryPick does not support more than 72-ary fat-tree topology because it uses VLAN tags to embed the link identifier, and VID field in VLAN is only 12 bits. PathSeer avoids such a limitation because its scheme scales up to 126-ary fat-tree topology.

Network Black Holes:

The probe packet sent by PathSeer could be dropped silently somewhere along its flight path for several reasons, including a switch misconfiguration, conflicting rules, and bugs in switch firmware. Such a problem is fundamental to most packet trajectory tracing techniques. Finding the faulty switch that drops the probe packet is non-trivial when multi-path routing is used in the network. Using embodiments described herein, PathSeer can narrow the searching range significantly. First, PathSeer can check the forwarding rules in the source and destination ToR switches and verify that the source ToR switch forwards the probe packet to the next hop (i.e., one of the Agg switches in the source pod). Second, it injects probe packets in all Agg switches located in the same pod as the source ToR switch. These probe packets each have a unique identifier in its payload. If all these probe packets reached the destination ToR switch through the shortest paths, then PathSeer only needs to check the forwarding behavior of Core switches. Otherwise, the inspection process can be limited and concentrated on the lost and detoured probe packets.

Routing Loops:

The probe packets might never reach some destinations if there are loops somewhere in the network. However, PathSeer is inherently immune from the impact of routing loops. When the probe packet starts looping among some switches in the network, its source MAC address will be fully filled. Consequently, one of the participating switches in the loop will send a copy of the packet to the SDN controller. Hence, the loop is detected and its location in the network can be easily identified.

Network Fault Localization:

The information encoded in the probe packet's header is basically the ingress ports of switches traversed by the probe packet. Such information also assists in identifying the faulty flow entries in the forwarding table of each switch in the packet's path.

Conventional systems for tracing packet trajectories in an SDN have several limitations and disadvantages. For example, Anteater uses SNMP to gather installed flow rules from network devices in order to model the network forwarding behavior. Libra and NetPlumber continuously dump the flow rules from network switches to maintain a stable snapshot of the network state. While these tools help to validate network-wide properties, constantly collecting a large number of rules from all switches in the network can be burdensome. Such approaches come with the expense of additional network instrumentation, including storing and analyzing a massive collection of network configuration data.

Veriflow intercepts the flow rules that are pushed to switches to provide a real-time network policy verification. The above works focus mainly on the detection of policy inconsistency, conflicting configurations, and routing faults. However, data plane problems are not discoverable through analyzing network configurations.

PathQuery, PathletTracer, and CherryPick emphasize tracing the ground-truth data plane forwarding paths by embedding the required information in the packet header. However, PathQuery and PathletTracer require a large number of flow rules even in moderate sized datacenter networks, which consume the resources of network switches. CherryPick cannot trace some complicated packet trajectories.

In contrast, embodiments described herein for PathSeer can determine the data plane forwarding behavior in a lightweight manner by tracing the trajectories of real traffic directly on the network switches. This accelerates network debugging tasks without the need to collect and handle large information sets about the network state. PathSeer significantly reduces the required flow rules and packet header space while it efficiently observes the network forwarding behavior.

Figure 14:
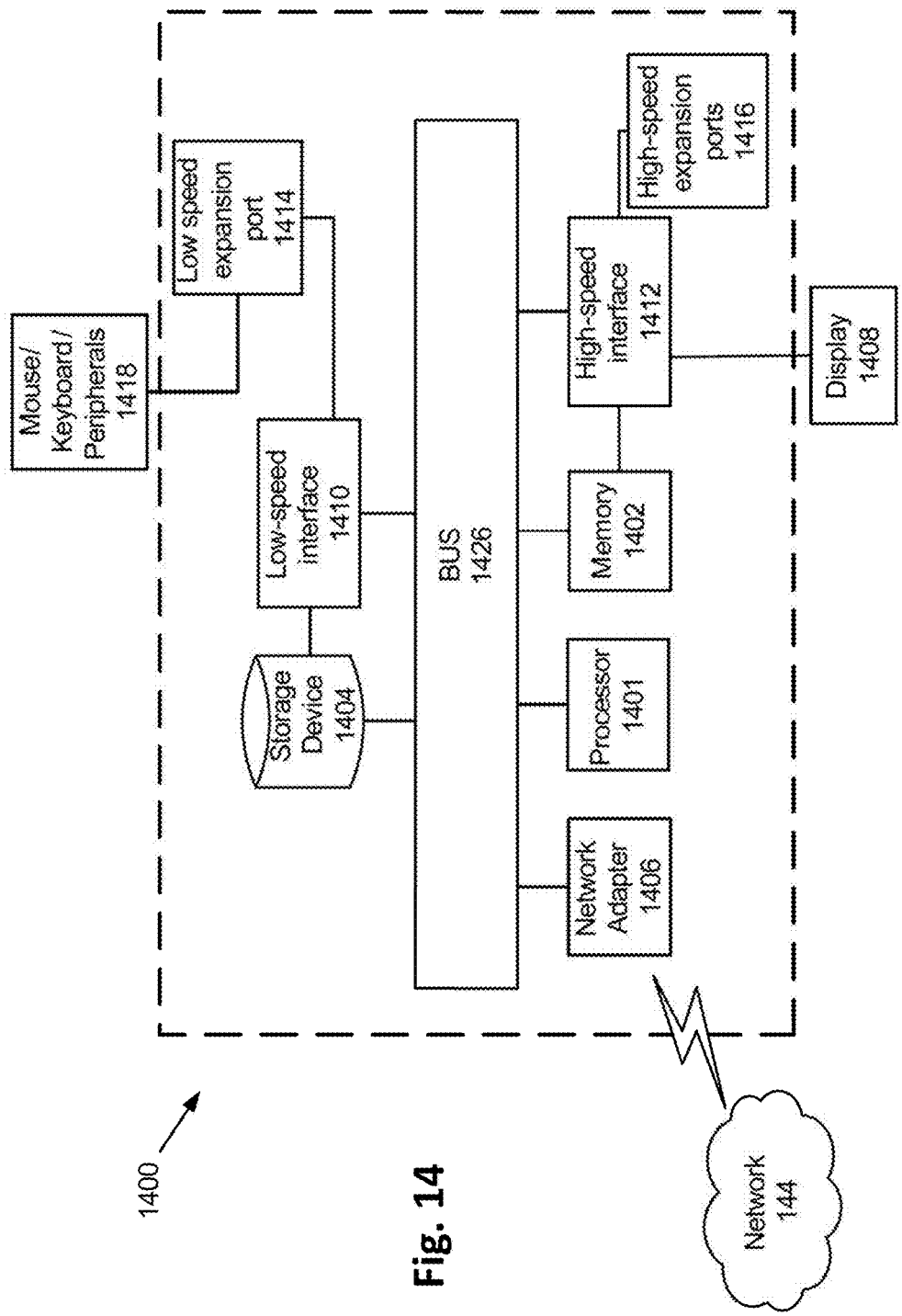
FIG. 14 is a schematic of an exemplary computing device according to one embodiment.

FIG. 14 is a schematic of an exemplary computing device 1400, such as the servers 150 used to implement the techniques described in this disclosure. The computing device 1400 is intended to represent various forms of digital hardware, such as laptops, desktops, workstations, personal digital assistants, servers, blade servers, mainframes, and other appropriate computers. The components shown here, their connections and relationships, and their functions are meant to be examples only and are not meant to be limiting.

In FIG. 14, the computing device 1400 includes a processor 1401, a memory 1402, a storage device 1404, a high-speed interface 1412 connecting to the memory 1402 and multiple high-speed expansion ports 1416, and a low-speed interface 1410 connecting to a low-speed expansion port 1414 and the storage device 1404. Each of the processor 1401, the memory 1402, the storage device 1404, the high-speed interface 1412, the high-speed expansion ports 1416, and the low-speed interface 1410 are interconnected using various busses, such as communication bus 1426, and may be mounted on a common motherboard or in other manners as appropriate.

The processor 1401 can process instructions for execution within the computing device 1400, including instructions stored in the memory 1402 or on the storage device 1404 to display graphical information for a GUI on an external input/output device, such as a display 1408 coupled to the high-speed interface 1412. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). The memory 1402 stores information within the computing device 1400. In some implementations, the memory 1402 is a high speed volatile memory unit or units. In some implementations, the memory 1402 is a non-volatile memory unit or units. The memory 1402 can also be another form of computer-readable medium, such as a magnetic or optical disk.

The storage device 1404 is capable of providing mass storage for the computing device 1400. In some implementations, the storage device 1404 can be or contain a computer-readable medium, such as a hard disk device, an optical disk device, magnetic disk, a flash memory or other similar solid state memory device, or an array of devices, including devices in a storage area network or other configurations. Instructions can be stored in an information carrier. The instructions, when executed by one or more processing devices (for example, processor 1401), perform one or more methods, such as those described above. The instructions can also be stored by one or more storage devices, such as computer- or machine-readable mediums (for example, the memory 1402, the storage device 1404, or memory on the processor 1401).

The high-speed interface 1412 manages bandwidth-intensive operations for the computing device 1400, while the low-speed interface 1410 manages lower bandwidth-intensive operations. Such allocation of functions is an example only. In some implementations, the high-speed interface 1412 is coupled to the memory 1402, the display 1408 (e.g., through a graphics processor or accelerator), and to the high-speed expansion ports 1416, which may accept various expansion cards (not shown). In the implementation, the low-speed interface 1410 is coupled to the storage device 1404 and the low-speed expansion port 1414. The low-speed expansion port 1414, which can include various communication ports (e.g., USB, Bluetooth, Ethernet, wireless Ethernet) can be coupled to one or more input/output devices 1418, such as a keyboard, a pointing device, a scanner, or a networking device such as a switch or router, e.g., through a network adapter.

The computing device 1400 also includes a network adapter 1406, such as an Intel Ethernet PRO network interface card from Intel Corporation of America, for interfacing with a network 144, to transmit data to network 144 or receive data from other machines on the network 144. As can be appreciated, the network 144 can be a public network, such as the Internet, or a private network such as an LAN or WAN network, or any combination thereof, and can also include PSTN or ISDN sub-networks. The network 144 can also be wired, such as an Ethernet network or using fiber optic cables, and can be wireless such as a cellular network including EDGE, 3G, 4G, and 5G wireless cellular systems. The wireless network can also be Wi-Fi, Bluetooth, or any other wireless form of communication that is known.

Although the computing device of FIG. 14 is described as having a storage medium device 1404, the claimed advancements are not limited by the form of the computer-readable media on which the instructions of the described processes are stored. For example, the instructions can be stored on CDs, DVDs, in FLASH memory, RAM, ROM, PROM, EPROM, EEPROM, hard disk, or any other information processing device with which the computing device communicates.

In other alternate embodiments, processing features according to the present disclosure may be implemented and commercialized as hardware, a software solution, or a combination thereof. Moreover, instructions corresponding to processes described herein could be stored in a portable drive, such as a USB Flash drive that hosts a secure process.

Computer programs (also known as programs, software, software applications, or code) associated with the processes described herein include machine instructions for a programmable processor, and can be implemented in a high-level procedural and/or object-oriented programming language, and/or in assembly/machine language. As used herein, the terms machine-readable medium and computer-readable medium refer to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described herein can be implemented on a computer having a display device 1408 (e.g., a CRT (cathode ray tube) or LCD (liquid crystal display) monitor) for displaying information to the user and a keyboard and a pointing device 1418 (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

Embodiments described herein can be implemented in conjunction with one or more of the devices described above with reference to FIG. 14. Embodiments are a combination of hardware and software, and processing circuitry by which the techniques described in this disclosure can be implemented.

FIG. 15 is an exemplary flowchart for a method 1500 of efficiently tracing a transit packet through a network. In step S1510, a tracing table having tracing rules is generated and installed, via a packet tracer process in a SDN controller, into a plurality of switches of a SDN based on a switch level in a network topology of the SDN. In one embodiment, the network includes a fat-tree topology.

In S1520, topology data is retrieved from the SDN controller.

In step S1530, a source switch and a destination switch are identified, via the SDN controller, from the plurality of switches for tracing a trajectory path of the transit packet within the SDN. In one embodiment, the SDN includes a lower level of switches, an intermediate level of switches, and an upper level of switches. The topology module in SDN controller keeps an update state of the network topology structure, and thus the packet tracer process can access and retrieve the required data from the SDN controller.

In step S1540, a probe packet is generated.

In step S1550, all bytes in a source MAC address of the probe packet are set to zero and a DCSP field of the probe packet is initialized to 16. In one embodiment, a first bit setting of the source MAC address of the probe packet is used to encode a trajectory path of the probe packet in lieu of tagging the probe packet. In a second embodiment, a second bit setting of the DSCP field of the probe packet pushes the probe packet to the tracing table for encoding a respective ingress port or the second bit setting pushes the probe packet directly to the forwarding table when encoding is not required.

In step S1560, the probe packet is injected into the source switch via a packet-out message. The packet-out message is set to push the probe packet to a forwarding table directly. The source switches in the packet trajectory are known. Therefore, it does not encode the ingress port of the injected probe packet.

In step S1570, selective ingress ports of one or more intermediate switches within the trajectory path are encoded into the source MAC address of the probe packet, via the tracing tables installed in the plurality of switches. The selective ingress ports are determined by the switch level in the network topology and a latest bit setting within the DSCP field and the source MAC address of the probe packet.

In step S1580, the probe packet is received at the SDN controller when the probe packet reaches the destination switch. In one embodiment, the packet tracer process in the SDN controller installs a specific flow rule in the destination switch to forward the probe packet back to the SDN controller. This flow rule is installed before the probe packet is injected into the SDN. When the SDN controller receives the probe packet, it forwards the received probe packet to the packet tracer process.

In step S1590, the probe packet is forwarded to the packet tracer process in the SDN controller.

In step S1595, the trajectory path of the transit packet is reconstructed using encoded information in the source MAC address of the probe packet, via the packet tracer process in the SDN controller. The reconstructed trajectory path is constructed via the encoded selective ingress ports of the one or more intermediate switches in which the probe packet has traversed.

Embodiments described herein include the following aspects.

(1) A method of efficiently tracing a transit packet through a network, includes generating and installing, via a packet tracer process in a Software Defined Network (SDN) controller, a tracing table having tracing rules into a plurality of switches of a SDN; retrieving topology data from the SDN controller; identifying, via the SDN controller, a source switch and a destination switch from the plurality of switches for tracing a trajectory path of the transit packet within the SDN; generating a probe packet; setting all bytes in source Media Access Control (MAC) address of the probe packet to zero and initializing a Differentiated Services Code Point (DSCP) field of the probe packet to 16; injecting the probe packet into the source switch via a packet-out message, wherein the packet-out message is set to push the probe packet to a forwarding table directly; encoding, via the tracing tables installed in the plurality of switches, selective ingress ports of one or more intermediate switches within the trajectory path into the source MAC address of the probe packet, wherein the selective ingress ports are determined by switch level in the network topology and a latest bit setting within the DSCP field and the source MAC address of the probe packet; receiving the probe packet at the SDN controller when the probe packet reaches the destination switch; forwarding the probe packet to the packet tracer process in the SDN controller; and reconstructing, via the packet tracer process in the SDN controller, the trajectory path of the transit packet using encoded information in the source MAC address of the probe packet, wherein the reconstructed trajectory path is constructed via the encoded selective ingress ports of the one or more intermediate switches in which the probe packet has traversed.

(2) The method of (1), wherein a first bit setting of the source MAC address of the probe packet is used to encode a trajectory path of the probe packet in lieu of tagging the probe packet.

(3) The method of either one of (1) or (2), wherein a second bit setting of the DSCP field of the probe packet pushes the probe packet to the tracing table for encoding a respective ingress port or the second bit setting pushes the probe packet directly to the forwarding table when encoding is not required.

(4) The method of any one of (1) through (3), wherein the network includes a fat-tree topology.

(5) The method of any one of (1) through (4), wherein the fat-tree topology includes a lower level of switches, an intermediate level of switches, and an upper level of switches.

(6) The method of any one of (1) through (5), wherein the first bit setting is the source MAC address of the probe packet and the second bit setting is the DSCP field in a header of the probe packet.

(7) The method of any one of (1) through (6), wherein the reconstructed trajectory path of the transit packet includes a packet-in message received at the SDN controller from the destination switch indicating an ingress port number at which the probe packet was received.

(8) The method of any one of (1) through (7), wherein the SDN controller includes an OpenFlow controller.

(9) The method of any one of (1) through (8), further includes rewriting the source MAC address of the probe packet via the installed tracing tables.

(10) A Software Defined Network (SDN) controller, having packet tracer processing circuitry. The packet tracer processing circuitry is configured to generate and install a tracing table with tracing rules into a plurality of switches of a SDN based on a switch level in a network topology of the SDN; retrieve data of the network topology from the SDN controller; identify a source switch and a destination switch from the plurality of switches for tracing a trajectory path of a transit packet within the SDN; generate a probe packet; set all bytes in a source Media Access Control (MAC) address of the probe packet to zero and initialize a Differentiated Services Code Point (DSCP) field of the probe packet to 16; inject the probe packet into the source switch via a packet-out message, wherein the packet-out message is set to push the probe packet to a forwarding table directly; encode selective ingress ports of one or more intermediate switches within the trajectory path into the source MAC address of the probe packet, via the tracing tables installed into the plurality of switches, wherein the selective ingress ports are determined by the switch level in the network topology and a latest bit setting within the DSCP field and the source MAC address of the probe packet; receive the probe packet at the SDN controller when the probe packet reaches the destination switch; forward the probe packet to the SDN controller; and reconstruct the trajectory path of the transit packet, via encoded information in the source MAC address of the probe packet, wherein the reconstructed trajectory path is constructed via the encoded selective ingress ports of the one or more intermediate switches in which the probe packet has traversed.

(11) The SDN controller of (10), wherein a first bit setting of the source MAC address of the probe packet is used to encode a trajectory path of the probe packet when the probe packet traverses the intermediate switches in the SDN.

(12) The SDN controller of either one of (10) or (11), wherein a second bit setting of the DSCP field of the probe packet pushes the probe packet to the tracing table for encoding a respective ingress port or the second bit setting directly pushes the probe packet to the forwarding table when encoding is not required.

(13) The SDN controller of any one of (10) through (12), wherein the SDN includes a fat-tree topology.

(14) The SDN controller of any one of (10) through (13), wherein the fat-tree topology includes a lower level of switches, an intermediate level of switches, and an upper level of switches.

(15) The SDN controller of any one of (10) through (14), wherein the reconstructed trajectory path of the transit packet includes a packet-in message received at the SDN controller from the destination switch indicating an ingress port number at which the probe packet was received.

(16) The SDN controller of any one of (10) through (15), wherein the SDN controller includes an OpenFlow controller.

(17) The SDN controller of any one of (10) through (16), wherein a source address field of the source MAC address is used for encoding information of the trajectory path of the transit packet.

(18) The SDN controller of any one of (10) through (17), wherein the packet tracer processing circuitry is further configured to rewrite the source address of the probe packet.

Conventional techniques for tracing transit packet trajectories in an SDN-enabled datacenter can incur large data collection overhead expenses with additional in-network instrumentation from storing and analyzing a massive collection of network configuration data. Other techniques trade off data plane resources to satisfy pre-specified queries, which can require installing a large number of flow rules in each switch in the network, especially in datacenter networks that often have many redundant paths between any given pair of edge nodes, such as ToR switches.

Embodiments herein describe a lightweight and scalable tracing technique for packet trajectories in SDN-enabled datacenters. PathSeer utilizes OpenFlow features for packet header rewriting to embed the ingress port number of the switches visited by a probe packet. Conventional systems employ host agents at the end-to-end path for injecting and receiving probe packets. In contrast, the probe packet of embodiments described herein can be injected at any point in the network and delivered to the SDN controller when it reaches its destination using PathSeer. PathSeer was applied to a fat-tree topology and the evaluation results showed that it significantly reduces the overhead of tracing packet trajectories, compared to the previous SDN-based tracing techniques.

PathSeer is carefully designed to be a flexible SDN debugger that does not intervene with any congestion control, load balancing, or routing techniques in datacenter networks. Furthermore, it significantly reduces the required flow rules for tracing packet trajectories, compared to state-of-the-art solutions, as it is independent of the topology size. PathSeer utilizes OpenFlow features for packet header rewriting to selectively encode the ingress port number of the switches, which the traced packet traverses into the source MAC address of the packet. Thus, it eliminates the overhead of increased header space (e.g., multiple VLAN tags).

PathSeer is designed to be an SDN tool that runs on a logically-centralized controller, such as an OpenFlow controller. Therefore, it has access to SDN controller modules, such as the topology and device manager. It can install specialized flow rules with high priority in the network switches. These flow rules encode the ingress-port numbers of the switches traversed by the probe packet into its packet header. Since datacenter network topologies are well-structured, PathSeer only encodes the minimum number of ingress ports that are essential to reconstruct the end-to-end path taken by a probe packet. Therefore, the header space of the probe packet is saved. The number of flow rules is negligible compared to conventional techniques. Therefore, the flow rules can be installed when PathSeer is first configured. In addition, no updates are needed, even if the topology size changes from added or removed switches.

Embodiments described herein are executed on a logically-centralized controller such as the SDN controller in FIG. 2, VLAN tags are eliminated, the number of flow rules are reduced, and PathSeer processes do not interfere with other network functions. Therefore, the efficiency of traffic tracing process is greatly increased by requiring less processing bandwidth capacity. In addition, much less data is processed since only the selective ingress ports of the one or more intermediate switches are encoded, rather than every switch traversed by the network packet. Also, the probe packet can be injected anywhere within the network, rather than from the beginning of the path to the end of the path. This requires much less processing capacity, as well as less storage and analysis of the traversed path. Therefore, the embodiments described herein describe a plurality of technical improvements to currently existing technical problems.

Embodiments described herein can trace possible packet trajectories within a topology up to a 126-ary fat-tree topology without increasing the packet header space or requiring any hardware modifications. The overhead of tracing packet trajectories in a datacenter network is greatly reduced, compared to conventional techniques. In addition, embodiments described herein are immune from the impact of routing loops in a network since it can detect such routing loops efficiently.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A method of efficiently tracing a transit packet through a network, the method comprising:
   generating and installing, via a packet tracer process in a Software Defined Network (SDN) controller, a tracing table having tracing rules into a plurality of switches of a SDN based on a switch level in a network topology of the SDN;
retrieving topology data from the SDN controller;
identifying, via the SDN controller, a source switch and a destination switch from the plurality of switches for tracing a trajectory path of the transit packet within the SDN;
generating a probe packet;
setting all bytes in a source Media Access Control (MAC) address of the probe packet to zero and initializing a Differentiated Services Code Point (DSCP) field of the probe packet to 16;
injecting the probe packet into the source switch via a packet-out message, wherein the packet-out message is set to push the probe packet to a forwarding table directly;
encoding, via the tracing table installed in the plurality of switches, selective ingress ports of one or more intermediate switches within the trajectory path into the source MAC address of the probe packet, wherein the selective ingress ports are determined by the switch level in the network topology and a latest bit setting within the DSCP field and the source MAC address of the probe packet;
receiving the probe packet at the SDN controller when the probe packet reaches the destination switch;
forwarding the probe packet to the packet tracer process in the SDN controller; and
reconstructing, via the packet tracer process in the SDN controller, the trajectory path of the transit packet using encoded information in the source MAC address of the probe packet, wherein the reconstructed trajectory path is constructed via the encoded selective ingress ports of the one or more intermediate switches in which the probe packet has traversed.

2. The method of claim 1, wherein a first bit setting of the source MAC address of the probe packet is used to encode a trajectory path of the probe packet in lieu of tagging the probe packet.

3. The method of claim 2, wherein a second bit setting of the DSCP field of the probe packet pushes the probe packet to the tracing table for encoding a respective ingress port or the second bit setting pushes the probe packet directly to the forwarding table when encoding is not required.

4. The method of claim 1, wherein the network includes a fat-tree topology.

5. The method of claim 4, wherein the fat-tree topology includes a lower level of switches, an intermediate level of switches, and an upper level of switches.

6. The method of claim 3, wherein the first bit setting is the source MAC address of the probe packet and the second bit setting is the DSCP field in a header of the probe packet.

7. The method of claim 1, wherein the reconstructed trajectory path of the transit packet includes a packet-in message received at the SDN controller from the destination switch indicating an ingress port number at which the probe packet was received.

8. The method of claim 1, wherein the SDN controller includes an OpenFlow controller.

9. The method of claim 1, further comprising:
rewriting the source MAC address of the probe packet via the installed tracing table.

10. A Software Defined Network (SDN) controller, comprising:
packet tracer processing circuitry configured to
generate and install a tracing table with tracing rules into a plurality of switches of a SDN based on a switch level in a network topology of the SDN;
retrieve data of the network topology from the SDN controller;
identify a source switch and a destination switch from the plurality of switches for tracing a trajectory path of a transit packet within the SDN;
generate a probe packet;
set all bytes in a source Media Access Control (MAC) address of the probe packet to zero and initialize a Differentiated Services Code Point (DSCP) field of the probe packet to 16;
inject the probe packet into the source switch via a packet-out message, wherein the packet-out message is set to push the probe packet to a forwarding table directly;
encode selective ingress ports of one or more intermediate switches within the trajectory path into the source MAC address of the probe packet, via the tracing table installed into the plurality of switches, wherein the selective ingress ports are determined by the switch level in the network topology and a latest bit setting within the DSCP field and the source MAC address of the probe packet;
receive the probe packet at the SDN controller when the probe packet reaches the destination switch;
forward the probe packet to the SDN controller, and
reconstruct the trajectory path of the transit packet, via encoded information in the source MAC address of the probe packet, wherein the reconstructed trajectory path is constructed via the encoded selective ingress ports of the one or more intermediate switches in which the probe packet has traversed.

11. The SDN controller of claim 10, wherein a first bit setting of the source MAC address of the probe packet is used to encode a trajectory path of the probe packet when the probe packet traverses the intermediate switches in the SDN.

12. The SDN controller of claim 11, wherein a second bit setting of the DSCP field of the probe packet pushes the probe packet to the tracing table for encoding a respective ingress port or the second bit setting directly pushes the probe packet to the forwarding table when encoding is not required.

13. The SDN controller of claim 10, wherein the SDN includes a fat-tree topology.

14. The SDN controller of claim 13, wherein the fat-tree topology includes a lower level of switches, an intermediate level of switches, and an upper level of switches.

15. The SDN controller of claim 10, wherein the reconstructed trajectory path of the transit packet includes a packet-in message received at the SDN controller from the destination switch indicating an ingress port number at which the probe packet was received.

16. The SDN controller of claim 10, wherein the SDN controller includes an OpenFlow controller.

17. The SDN controller of claim 10, wherein a source address field of the source MAC address is used for encoding information of the trajectory path of the transit packet.

18. The SDN controller of claim 10, wherein the packet tracer processing circuitry is further configured to rewrite the source address of the probe packet.

* * * * *